US012546463B2

(12) United States Patent
Dumler et al.

(10) Patent No.: US 12,546,463 B2
(45) Date of Patent: Feb. 10, 2026

(54) LIGHT FIXTURE JOINING SYSTEM

(71) Applicant: SIGNIFY HOLDING B.V., Eindhoven (NL)

(72) Inventors: Bryan Dumler, Aurora, CO (US); Stephanie Miller, Englewood, CO (US)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 18/876,720

(22) PCT Filed: Jun. 26, 2023

(86) PCT No.: PCT/EP2023/067278
§ 371 (c)(1),
(2) Date: Dec. 19, 2024

(87) PCT Pub. No.: WO2024/002951
PCT Pub. Date: Jan. 4, 2024

(65) Prior Publication Data

US 2025/0369597 A1 Dec. 4, 2025

Related U.S. Application Data

(60) Provisional application No. 63/357,742, filed on Jul. 1, 2022.

(30) Foreign Application Priority Data

Jul. 28, 2022 (EP) ..................................... 22187600

(51) Int. Cl.
*F21V 15/015* (2006.01)
*F21S 2/00* (2016.01)
(Continued)

(52) U.S. Cl.
CPC ............ *F21V 21/005* (2013.01); *F21S 2/005* (2013.01); *F21S 8/046* (2013.01); *F21V 15/015* (2013.01); *F21V 21/40* (2013.01)

(58) Field of Classification Search
CPC ....... F21V 15/015; F21V 21/005; F21S 8/046
See application file for complete search history.

(56) References Cited

U.S. PATENT DOCUMENTS

| | | | | |
|---|---|---|---|---|
| 5,628,557 | A | 5/1997 | Huang | |
| 11,255,521 | B1 * | 2/2022 | McCane | F21V 7/0008 |

(Continued)

FOREIGN PATENT DOCUMENTS

| | | | |
|---|---|---|---|
| CN | 107477529 | A | 12/2017 |
| CN | 210511099 | U | 5/2020 |

(Continued)

*Primary Examiner* — Sean P Gramling

(57) ABSTRACT

A joining system (195) for joining adjacent light fixtures (190) can include a pulling apparatus (550) and a bracket (440) configured to be coupled to a frame (220-1) of a first light fixture (190-1). The joining system (195) can also include a first anchor (660-1) and a second anchor (660-2) configured to be coupled to the frame (220-2) of a second light fixture (190-2), wherein the anchors include a pulling apparatus coupling feature that is configured to couple to a distal portion of the pulling apparatus. A distal end of the distal portion of the pulling apparatus can be configured to traverse through an aperture in a top wall of the frame of the first light fixture. The second light fixture can be pulled along the bracket toward the first light fixture when a sufficiently large upward force is applied to the distal end of a distal portion of the pulling apparatus.

15 Claims, 15 Drawing Sheets

(51) Int. Cl.

| | |
|---|---|
| ***F21S 8/04*** | (2006.01) |
| ***F21V 21/005*** | (2006.01) |
| ***F21V 21/40*** | (2006.01) |

(56) References Cited

U.S. PATENT DOCUMENTS

| | | | | |
|---|---|---|---|---|
| 2018/0135836 | A1 | 5/2018 | Germain | |
| 2019/0041041 | A1 | 2/2019 | DeBruin et al. | |
| 2021/0148531 | A1* | 5/2021 | Donnelly ................ | F21S 8/061 |
| 2022/0074578 | A1 | 3/2022 | Ni et al. | |

FOREIGN PATENT DOCUMENTS

| | | | |
|---|---|---|---|
| DE | 102019135021 | A1 | 6/2021 |
| EP | 3106745 | A1 | 12/2016 |
| EP | 3543603 | A1 | 9/2019 |
| EP | 3617581 | A1 | 3/2020 |
| WO | 2021057941 | A1 | 4/2021 |
| WO | 2021089365 | A1 | 5/2021 |

* cited by examiner

LIGHT FIXTURE JOINING SYSTEM

CROSS-REFERENCE TO PRIOR APPLICATIONS

This application is the U.S. National Phase application under 35 U.S.C. § 371 of International Application No. PCT/EP2023/067278, filed on Jun. 26, 2023, which claims the benefit of European Patent Application No. 22187600.6, filed on Jul. 28, 2022, and U.S. Provisional Application No. 63/357,742, filed on Jul. 1, 2022. These applications are hereby incorporated by reference herein.

TECHNICAL FIELD

The present disclosure relates generally to light fixtures, and more particularly to systems, methods, and devices for joining light fixtures.

BACKGROUND

Linear light fixtures are often installed end-to-end to create a single extended linear luminaire. In such cases, light can leak between adjoining fixtures. Numerous methods (e.g., clips, brackets with screws) are used in the current art in an attempt to minimize or eliminate light leakage between adjacent fixtures. Some of these methods are ineffective. Others of these methods, while more effective at achieving the goal of light leakage, can complicate the installation process, adding to costs and frustration of installers.

SUMMARY

In general, in one aspect, the disclosure relates to a joining system for joining adjacent light fixtures. The joining system can include a pulling apparatus having a proximal portion, a first distal portion, and a second distal portion. The joining system can also include a bracket configured to be coupled to a frame of a first light fixture, where the bracket includes a frame receiving feature and a pulling apparatus receiving feature, where the frame receiving feature is configured to be slidably coupled to the frame of a second light fixture, and where the pulling apparatus receiving feature is configured to slidably couple to the proximal portion of the pulling apparatus. The joining system can further include a first anchor configured to be coupled to the frame of the second light fixture, where the first anchor comprises a first pulling apparatus coupling feature that is configured to couple to the first distal portion of the pulling apparatus. The joining system can also include a second anchor configured to be coupled to the frame of the second light fixture, where the second anchor comprises a second pulling apparatus coupling feature that is configured to couple to the second distal portion of the pulling apparatus. The joining system can further include a gripper coupled to the pulling apparatus receiving feature of the bracket, where the gripper includes a channel that passes therethrough, and where the channel is configured to have the proximal portion of the pulling apparatus slidably disposed therein.

In other aspects, the disclosure relates to a linear lighting system that includes a first linear light fixture includes a first frame having a top wall, a first side wall, and a second side wall, where the top wall has an aperture that traverses therethrough toward its distal end. The linear lighting system can also include a second linear light fixture includes a second frame. The linear lighting system can further include a joining system configured to join the second linear light fixture to the first linear light fixture. The joining system can include a pulling apparatus having a proximal portion, a first distal portion, and a second distal portion. The joining system can also include a bracket coupled to the frame of the first linear light fixture, where the bracket includes a frame receiving feature and a pulling apparatus receiving feature, where the frame receiving feature is configured to be slidably coupled to the frame of the second linear light fixture, and where the pulling apparatus receiving feature is configured to slidably couple to the proximal portion of the pulling apparatus. The joining system can further include a first anchor coupled to the first side wall of the frame of the second linear light fixture, where the first anchor includes a first pulling apparatus coupling feature that is configured to couple to the first distal portion of the pulling apparatus. The joining system can also include a second anchor coupled to the second side wall of the frame of the second linear light fixture, where the second anchor includes a second pulling apparatus coupling feature that is configured to couple to the second distal portion of the pulling apparatus. The joining system can further include a gripper coupled to the pulling apparatus receiving feature of the bracket, where the gripper includes a channel that passes therethrough, where the channel is configured to have the proximal portion of the pulling apparatus slidably disposed therein, and where the gripper reduces slack in the pulling apparatus between the gripper and the first anchor and the second anchor. A distal end of the distal portion of the pulling apparatus can be configured to traverse through the aperture in the top wall of the frame of the first linear light fixture, where the second linear light fixture is pulled along the bracket toward the first linear light fixture when a sufficiently large upward force pulls the distal end of the distal portion of the pulling apparatus.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

DETAILED DESCRIPTION

Figure 1A:
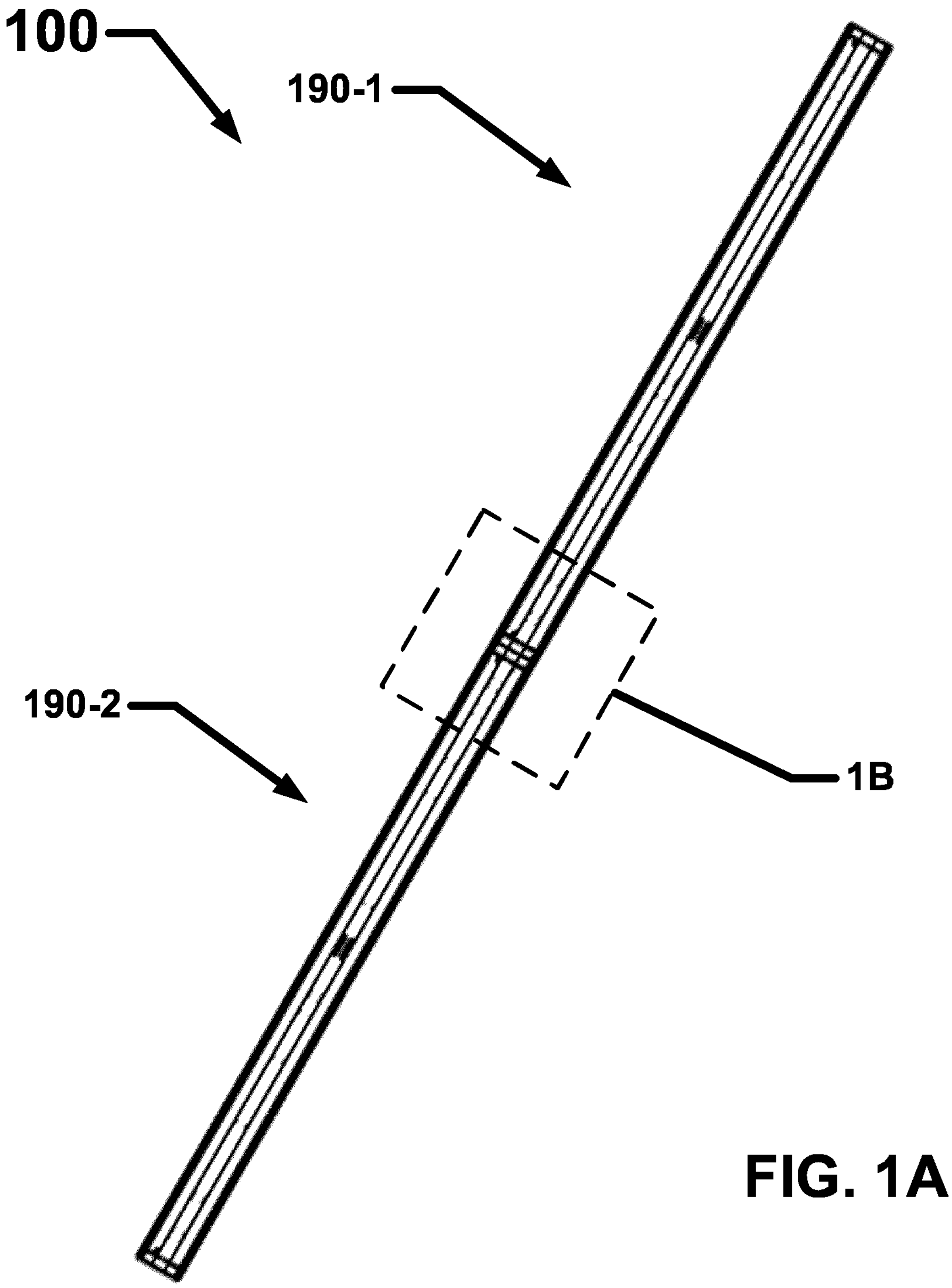
FIGS. 1A through 1I shows various views of a linear lighting system according to certain example embodiments.

In general, example embodiments provide systems, methods, and devices for joining systems for linear light fixtures. Example embodiments can provide a number of benefits. Such benefits can include, but are not limited to, fewer parts to keep in inventory, modularity, ease of installation, effective light leakage control, user control, and simple configurability. Example embodiments can be used with new linear light fixtures or retrofit with existing linear light fixtures. Example embodiments described herein can be used with linear light fixtures having any of a number of lengths (e.g., 6 inches, 12 inches, 24 inches). Also, while example embodiments are directed to linear light fixtures, example embodiments can be used with any type of light fixtures that are configured to be joined together. For instance, example embodiments can be used to join light fixtures having any non-linear shape with flat connecting surfaces.

Linear light fixtures with example joining systems can be located in one or more of any of a number of environments. Examples of such environments can include, but are not limited to, indoors, outdoors, a parking garage, a kitchen or cooking space, a hallway, an entertainment room, an office space, a manufacturing plant, a warehouse, and a storage facility, any of which can be climate-controlled or non-climate-controlled. In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill.

Linear light fixtures with example joining systems can be directly or indirectly mounted onto any of a number of different structures. Such structures can include, but are not limited to, drywall, wood studs, concrete, and ceiling tile. Indirect mounting of linear light fixtures with example joining systems can involve the use of cables, standoffs, conduit, and spacers. A user may be any person that interacts with linear light fixtures. Examples of a user may include, but are not limited to, an engineer, an electrician, an instrumentation and controls technician, a mechanic, an operator, a property manager, a homeowner, a tenant, an employee, a consultant, a contractor, and a manufacturer's representative.

Linear light fixtures with example joining systems (including portions thereof) can be made of one or more of a number of suitable materials to allow the linear light fixtures to meet certain standards and/or regulations while also maintaining durability in light of the one or more conditions under which the linear light fixtures and/or other associated components (e.g., an example joining system), including components thereof, of the linear light fixtures can be exposed. Examples of such materials can include, but are not limited to, aluminum, stainless steel, fiberglass, glass, plastic, polymer, ceramic, and rubber.

Example joining systems, or portions or components thereof, described herein can be made from a single piece (as from a mold, injection mold, die cast, or extrusion process). In addition, or in the alternative, example joining systems (including portions or components thereof) can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, snap fittings, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, abutting against, in communication with, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example joining system to become coupled, directly or indirectly, to one or more other components (e.g., a frame, a tray) of the joining system, to some other component of a linear light fixture and/or to a structure (e.g., a stud, drywall, a beam). A coupling feature can include, but is not limited to, a clamp, a portion of a hinge, an aperture, a recessed area, a protrusion, a hole, a slot, a tab, a detent, and mating threads. One portion of an example joining system can be coupled to a component (e.g., a trim, a housing) of the joining system, to some other component of a linear light fixture, and/or to a structure by the direct use of one or more coupling features.

In addition, or in the alternative, a portion of an example joining system can be coupled to another component of the joining system, to another component (e.g., a frame, a tray) of a linear light fixture, and/or to a structure using one or more independent devices that interact with one or more coupling features disposed on a component of the joining system. Examples of such devices can include, but are not limited to, a pin, a hinge, a fastening device (e.g., a bolt, a screw, a rivet), epoxy, glue, adhesive, and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of joining systems for linear light fixtures, one or more of the components shown may be omitted, repeated, and/or substituted. Accordingly, example embodiments of joining systems for linear light fixtures should not be considered limited to the specific arrangements of components shown in any of the figures. For example, features shown in one or more figures or described with respect to one embodiment can be applied to another embodiment associated with a different figure or description.

In certain example embodiments, linear light fixtures having example joining systems are subject to meeting certain standards and/or requirements. For example, the National Electric Code (NEC), the National Electrical Manufacturers Association (NEMA), the International Electrotechnical Commission (IEC), the Federal Communication Commission (FCC), Underwriters Laboratories (UL), and the Institute of Electrical and Electronics Engineers (IEEE) set standards as to electrical enclosures, wiring, and electrical connections. Use of example embodiments described herein meet (and/or allow the linear light fixtures to meet) such standards when applicable.

If a component of a figure is described but not expressly shown or labeled in that figure, the label used for a corresponding component in another figure can be inferred to that component. Conversely, if a component in a figure is labeled but not described with respect to that figure, the description for such component can be substantially the same as the description for a corresponding component in another figure. The numbering scheme for the various components in the figures herein is such that each component is a three-digit number, and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of joining systems for linear light fixtures will be described more fully hereinafter with reference to the accompanying drawings, in which example embodiments of joining systems for linear light fixtures are shown. Joining systems for linear light fixtures may, however, be embodied in many different forms and should not be construed as limited to the example embodiments set forth herein. Rather, these example embodiments are provided so that this disclosure will be thorough and complete, and will fully convey the scope of joining systems for linear light fixtures to those of ordinary skill in the art. Like, but not necessarily the same, elements (also sometimes called components) in the various figures are denoted by like reference numerals for consistency.

Terms such as “first”, “second”, “above”, “below”, “inner”, “outer”, “distal”, “proximal”, “end”, “top”, “bottom”, “upper”, “lower”, “side”, “left”, “right”, “front”, “rear”, and “within”, when present, are used merely to distinguish one component (or part of a component or state of a component) from another. Such terms are not meant to denote a preference or a particular orientation. Such terms are not meant to limit embodiments of joining systems for linear light fixtures. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Figure 1B:
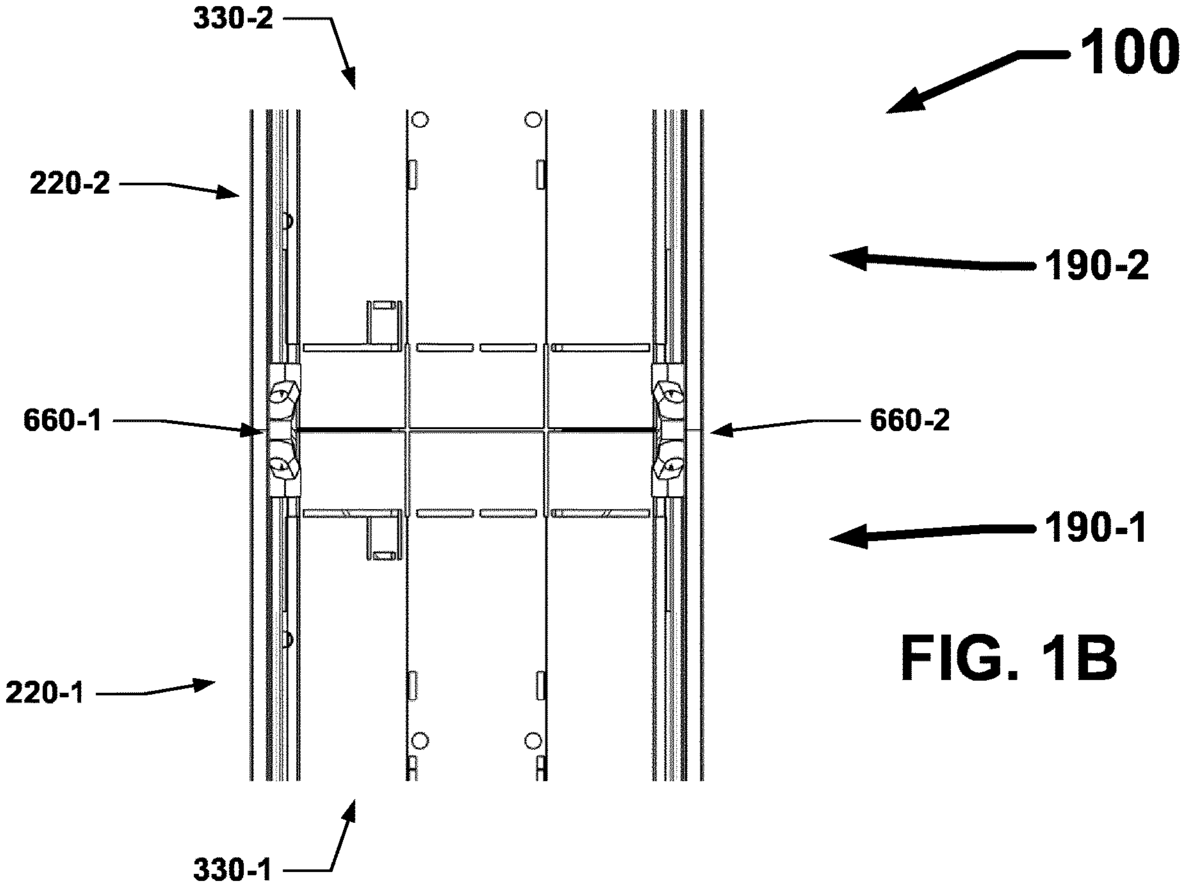
Figure 1C:
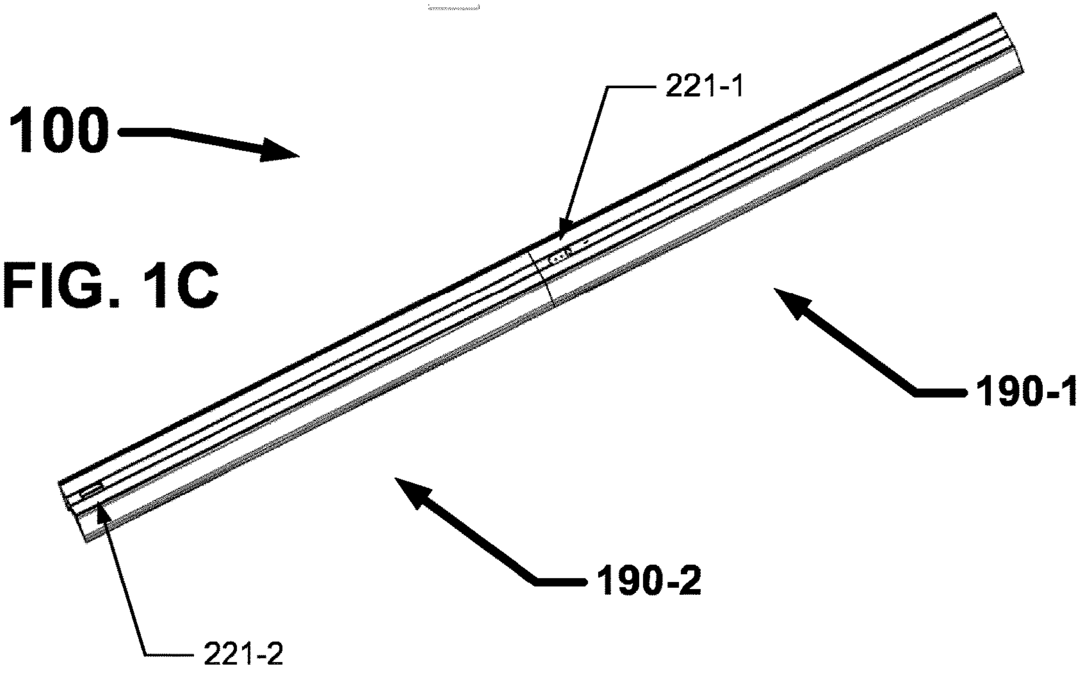
Figure 1D:
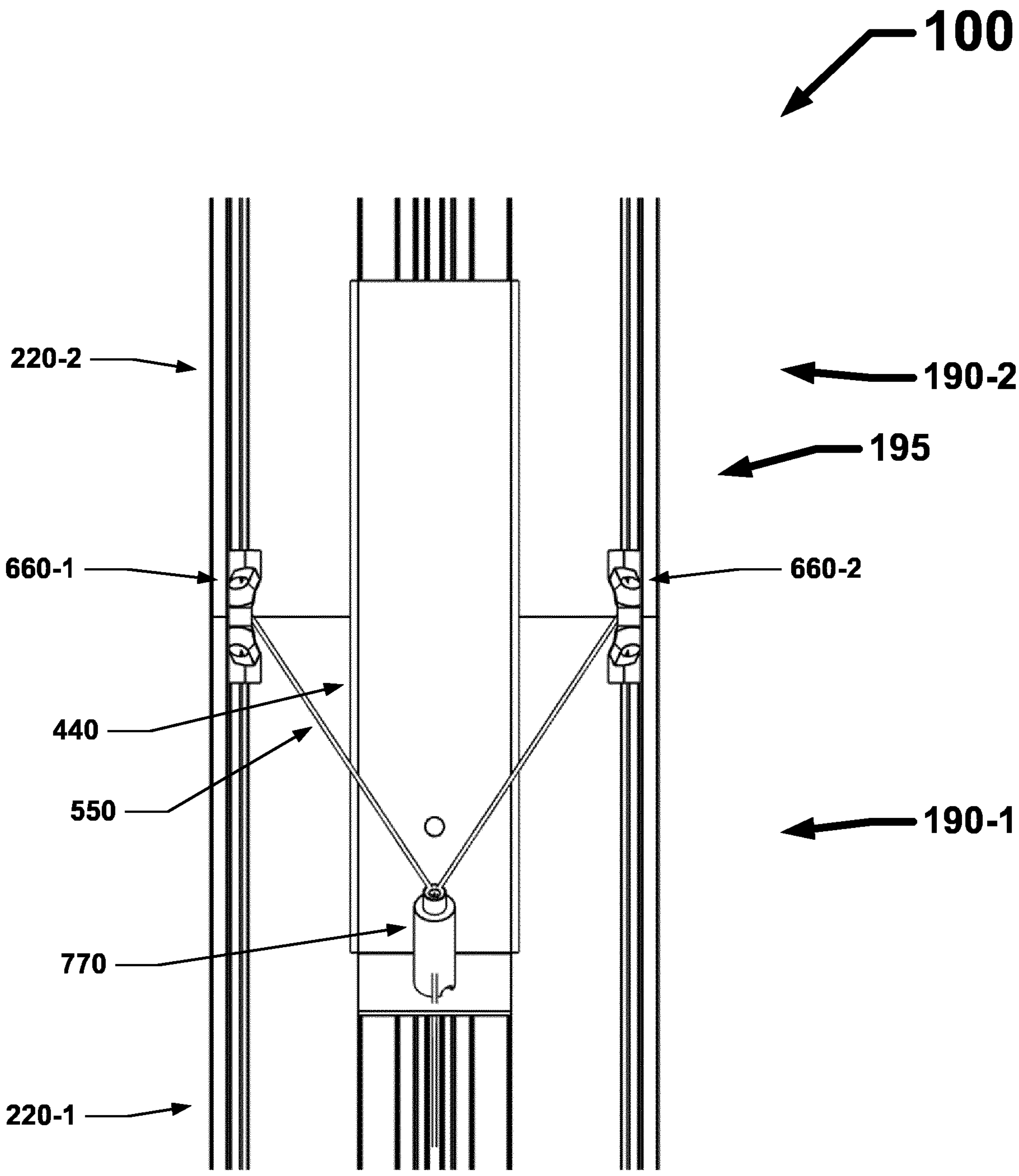
Figure 1E:
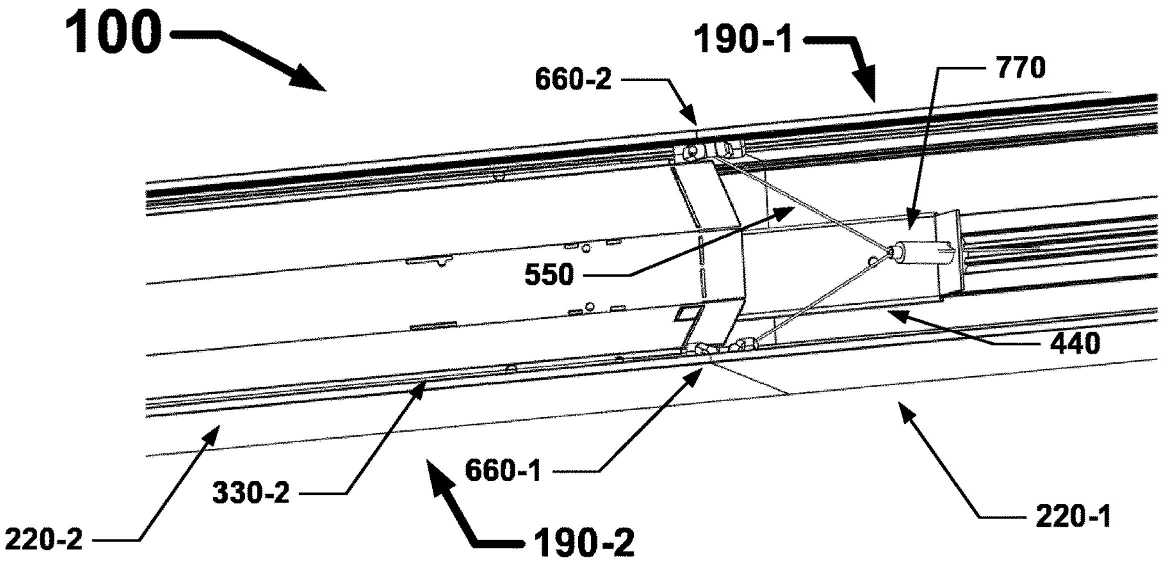
Figure 1F:
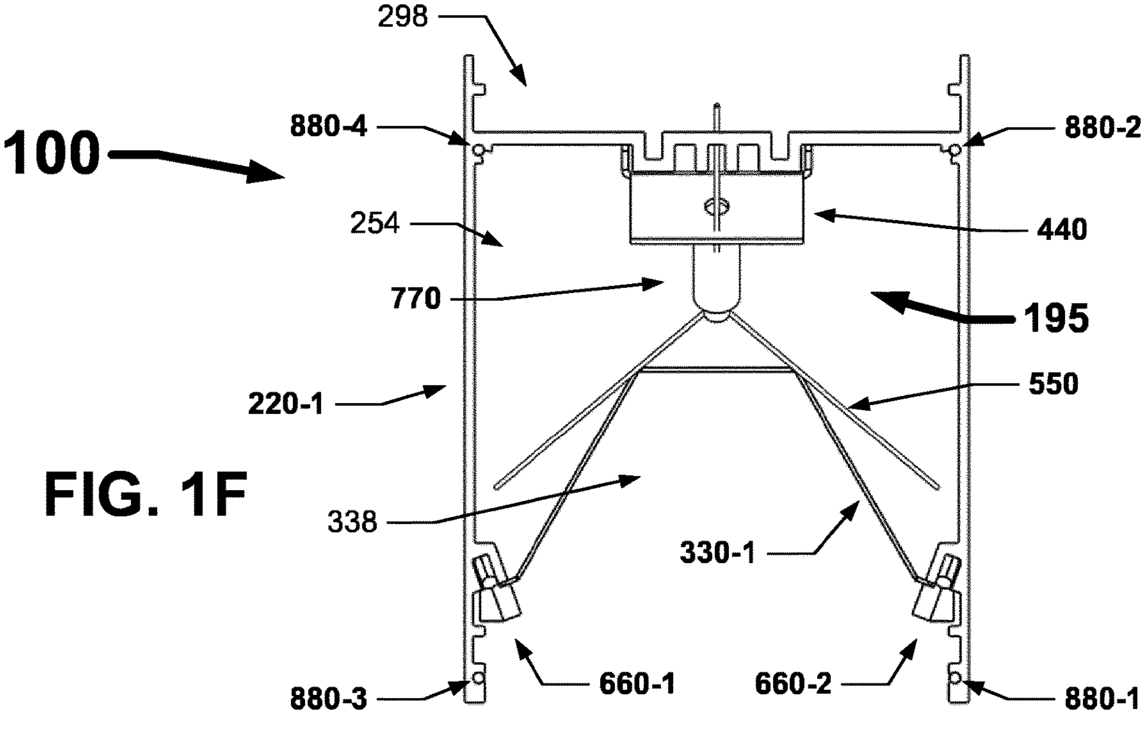
Figure 1G:
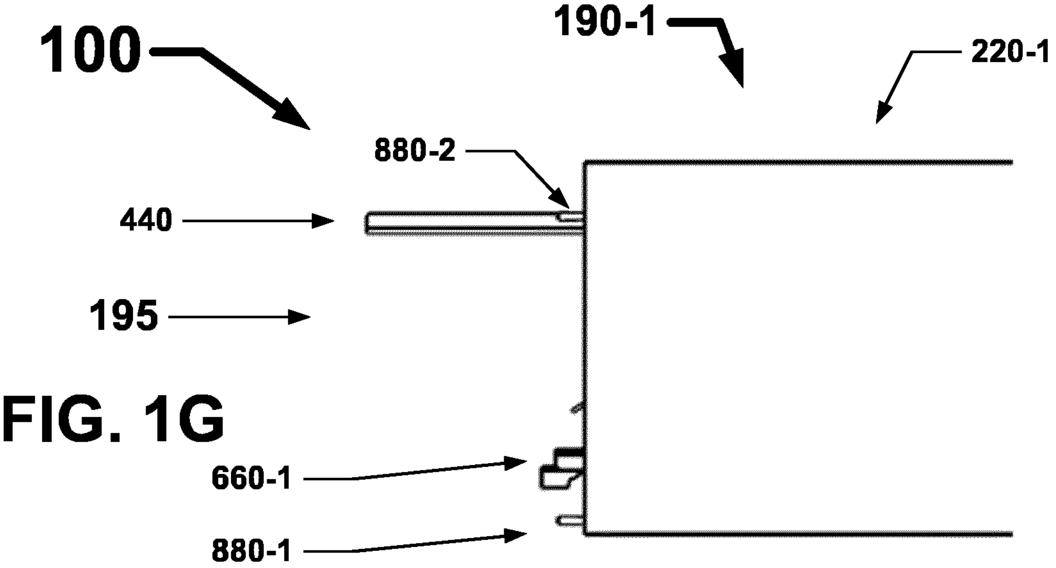
Figure 1H:
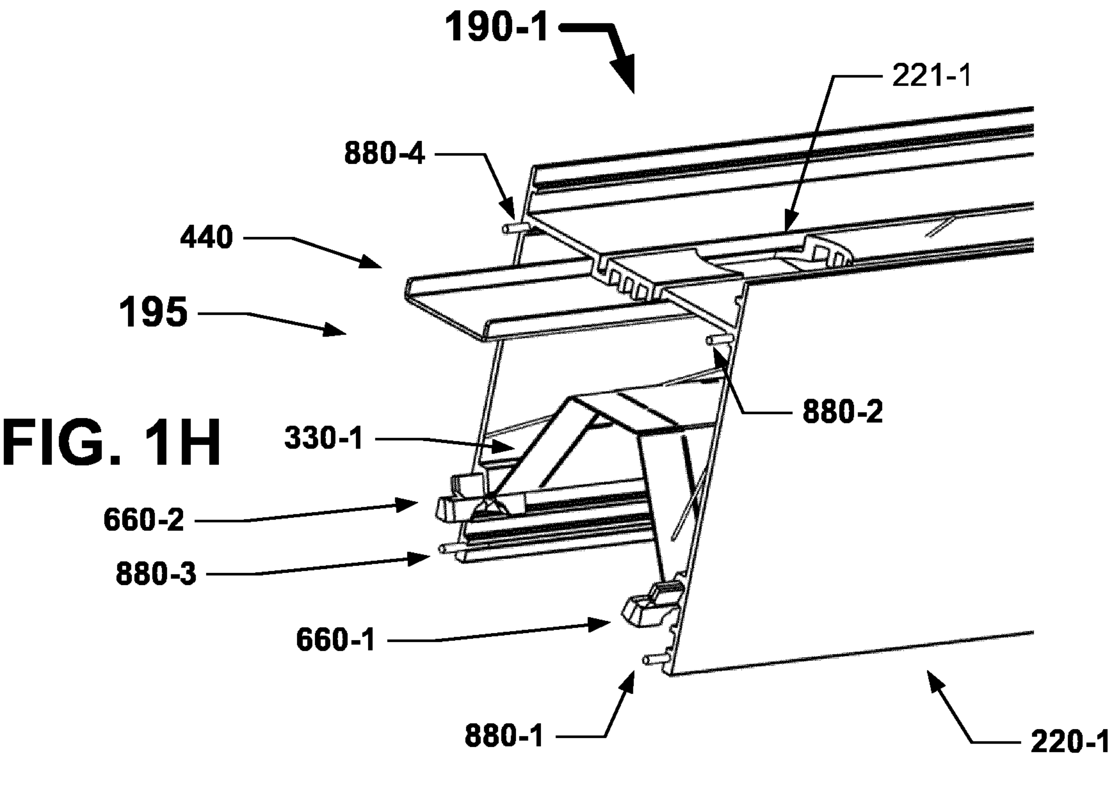
Figure 1I:
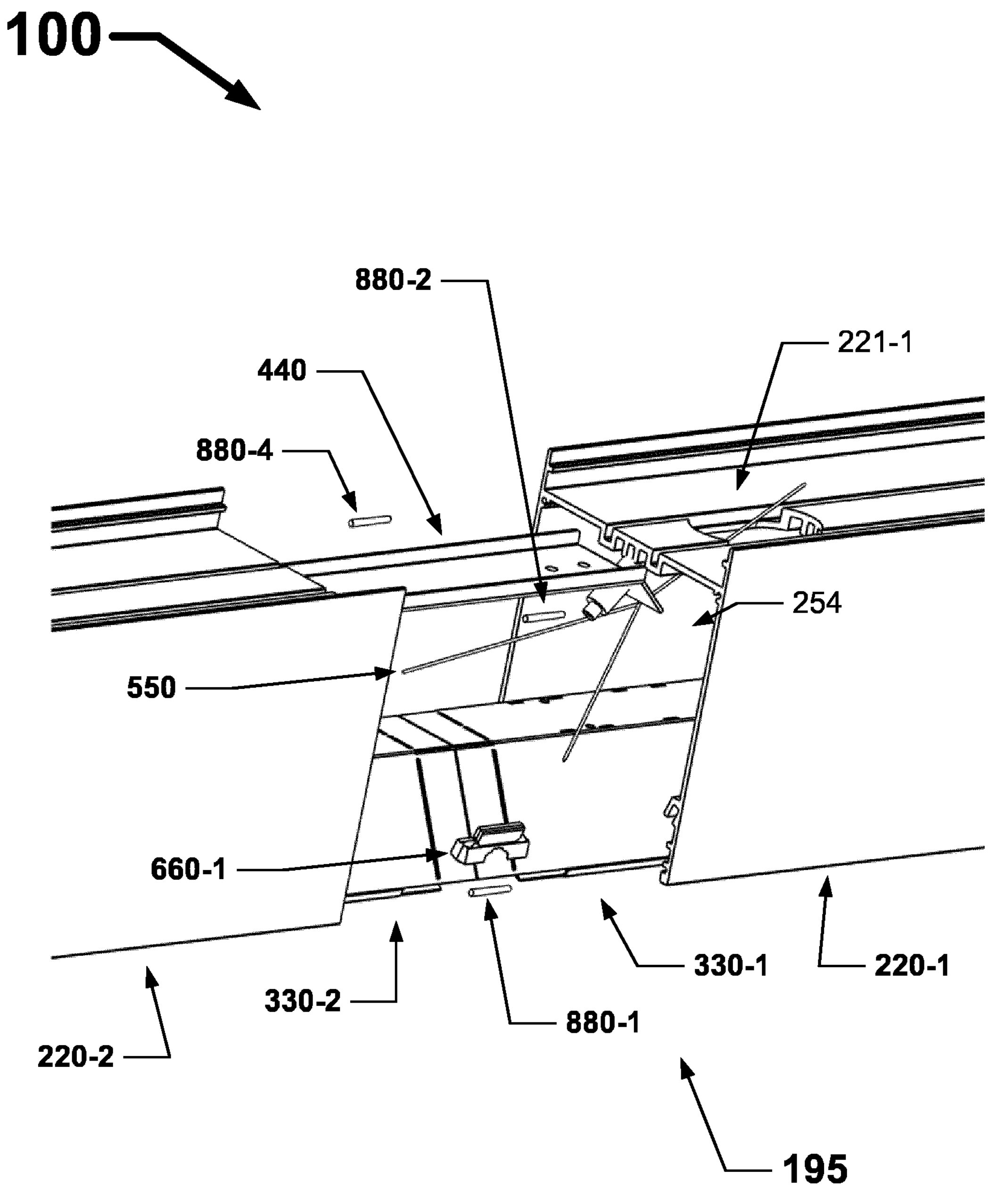

FIGS. 1A through 1I shows various views of a linear lighting system 100 according to certain example embodiments. Specifically, FIG. 1A shows a bottom view of the linear lighting system 100. FIG. 1B shows a detailed bottom view of the linear lighting system 100. FIG. 1C shows a top view of the linear lighting system 100. FIG. 1D shows a bottom view of the linear lighting system 100 with the trays 330 (tray 330-1 and tray 330-2) removed. FIG. 1E shows a bottom view of the linear lighting system 100 with the tray 330-1 removed. FIG. 1F shows a sectional front view of the linear lighting system 100. FIG. 1G shows a side view of the linear lighting system 100 without the linear light fixture 190-2 removed. FIG. 1H shows a top perspective view of the linear lighting system 100 without the linear light fixture 190-2 removed. FIG. 1I shows a partially exploded top perspective view of the linear lighting system 100.

Figure 2A:
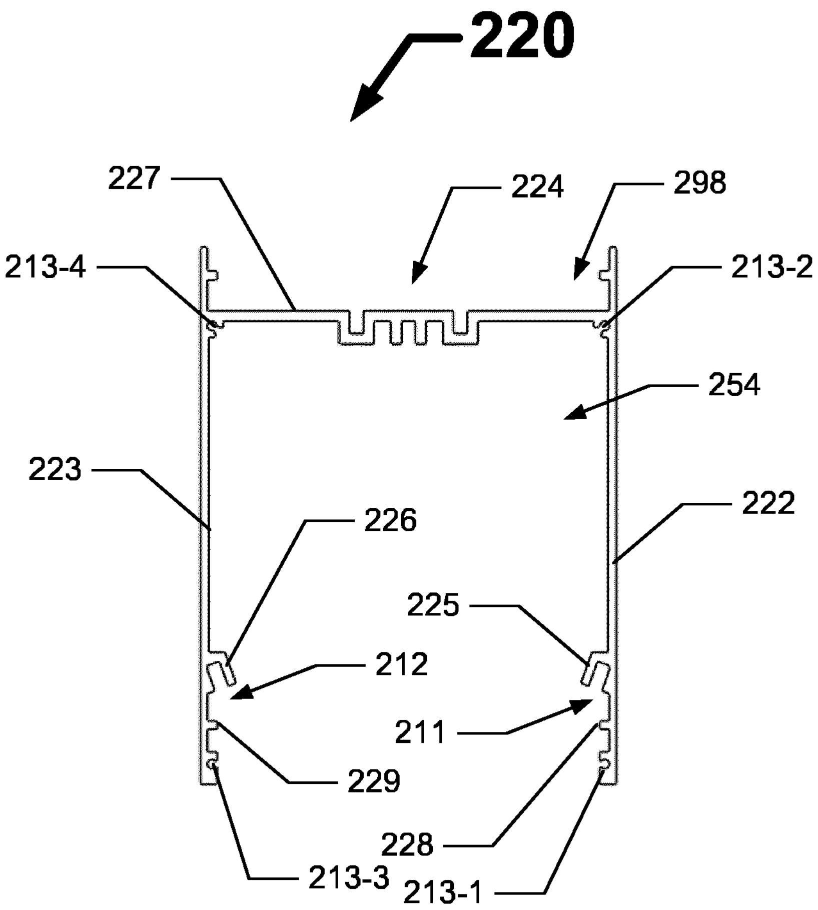
FIGS. 2A and 2B show various views of a frame for a linear light fixture of FIGS. 1A through 1I according to certain example embodiments.
Figure 2B:
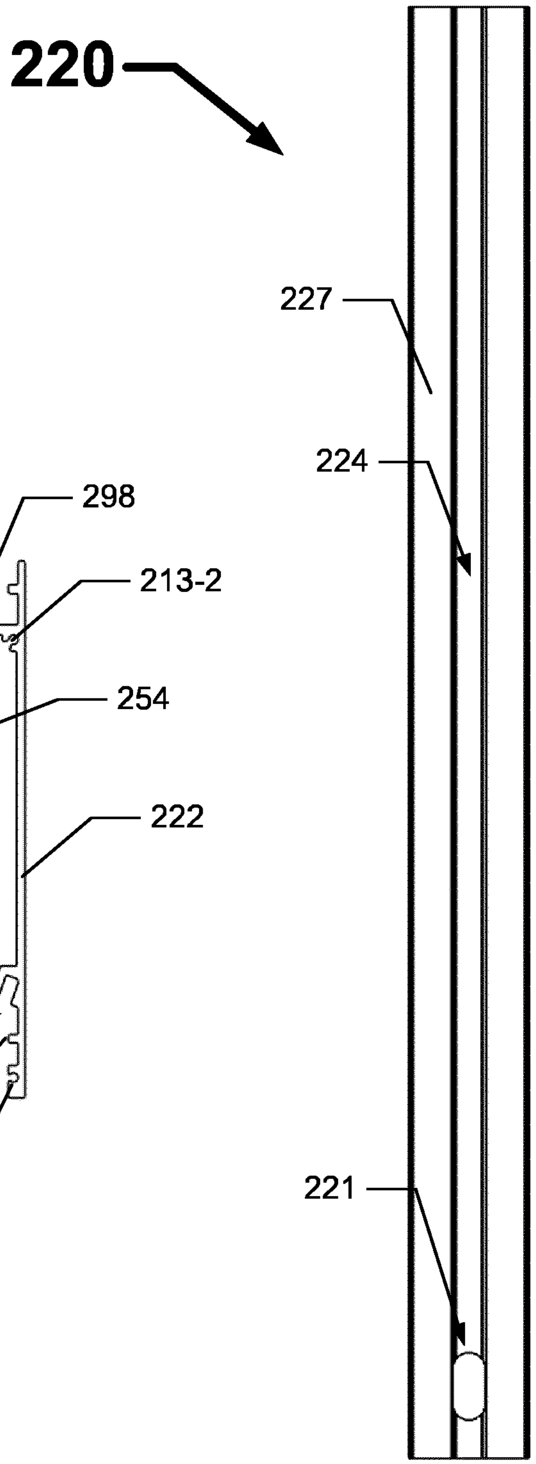
Figure 3A:
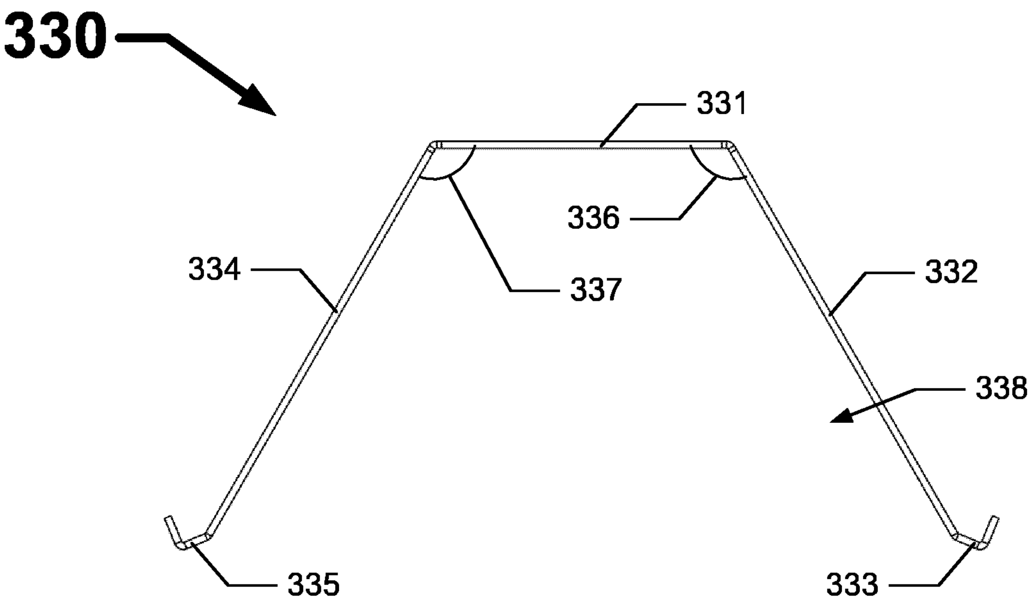
FIGS. 3A and 3B show various views of a tray for a linear light fixture of FIGS. 1A through 1I according to certain example embodiments.
Figure 3B:
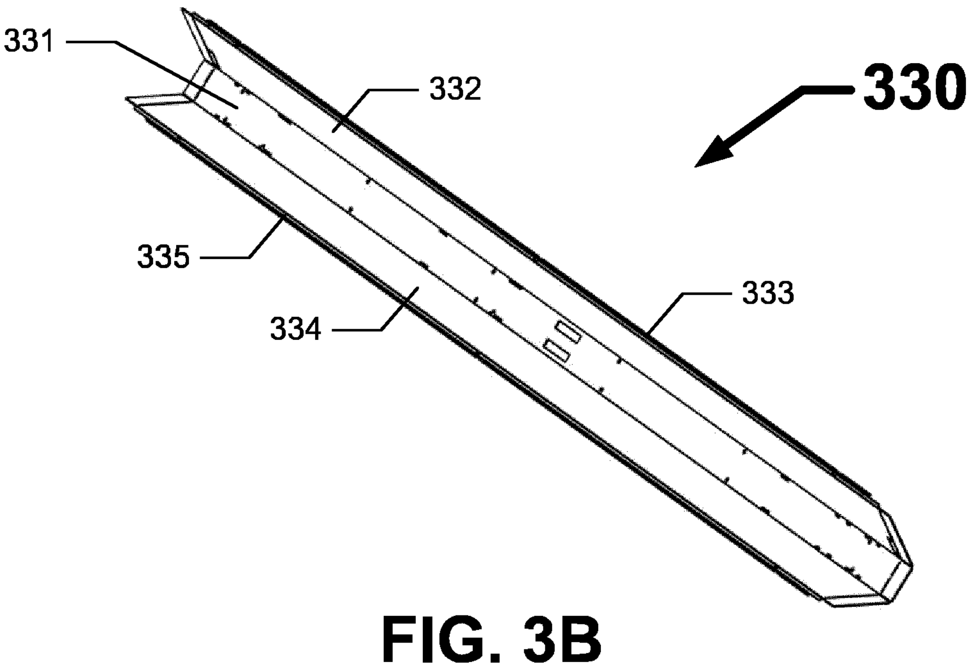

FIGS. 2A and 2B show various views of a frame 220 for a linear light fixture of FIGS. 1A through 1I according to certain example embodiments. Specifically, FIG. 2A shows a front view of the frame 220. FIG. 2B shows a top view of the frame 220. FIGS. 3A and 3B show various views of a tray 330 for a linear light fixture of FIGS. 1A through 1I according to certain example embodiments. Specifically, FIG. 3A shows a front view of the tray 330, and FIG. 3B shows a bottom perspective view of the tray 330.

Figure 4A:
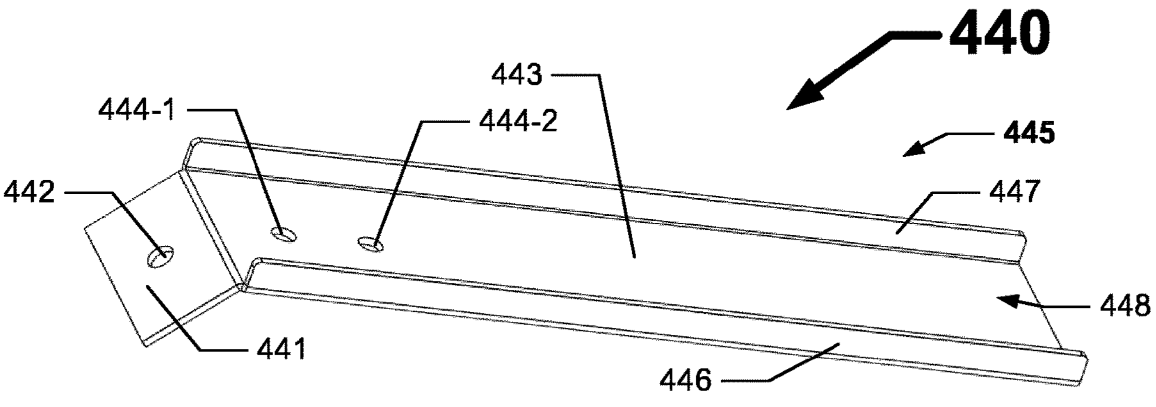
FIGS. 4A through 4C show various views of the bracket of the joining system of FIGS. 1A through 1I according to certain example embodiments.
Figure 4B:
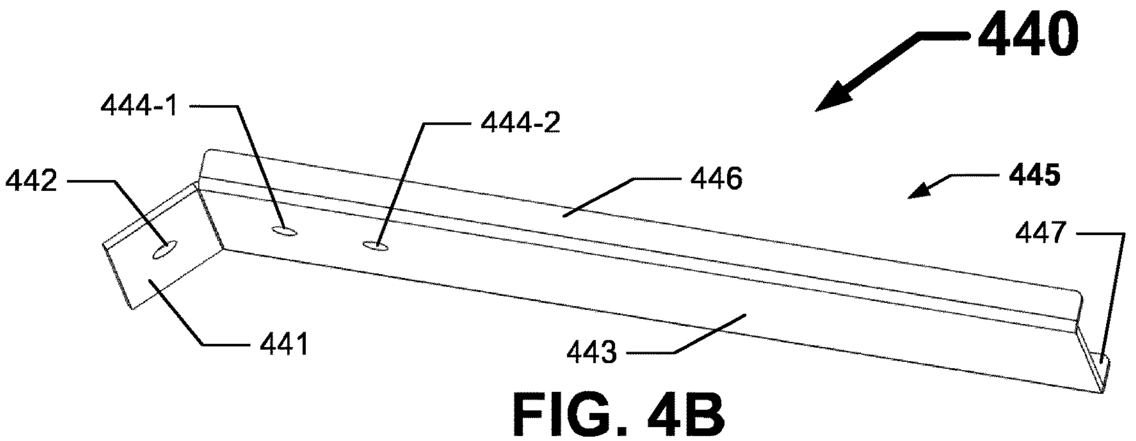
Figure 4C:
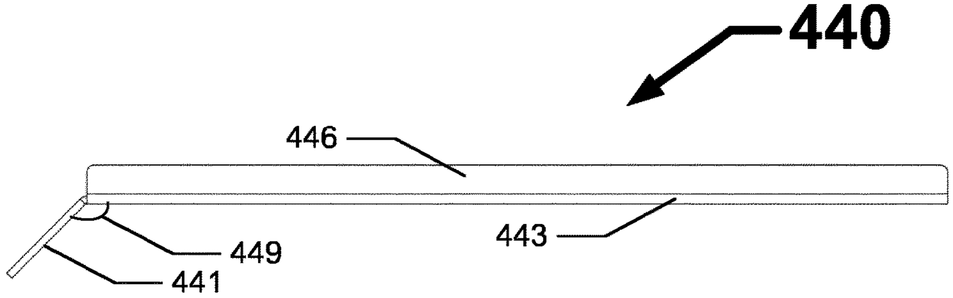
Figure 5:
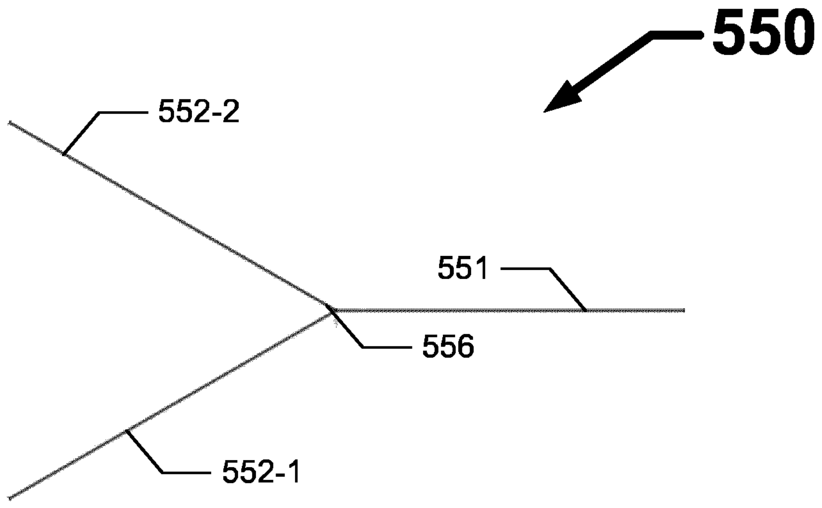
FIG. 5 shows the pulling apparatus of the joining system of FIGS. 1A through 1I according to certain example embodiments.
Figure 6A:
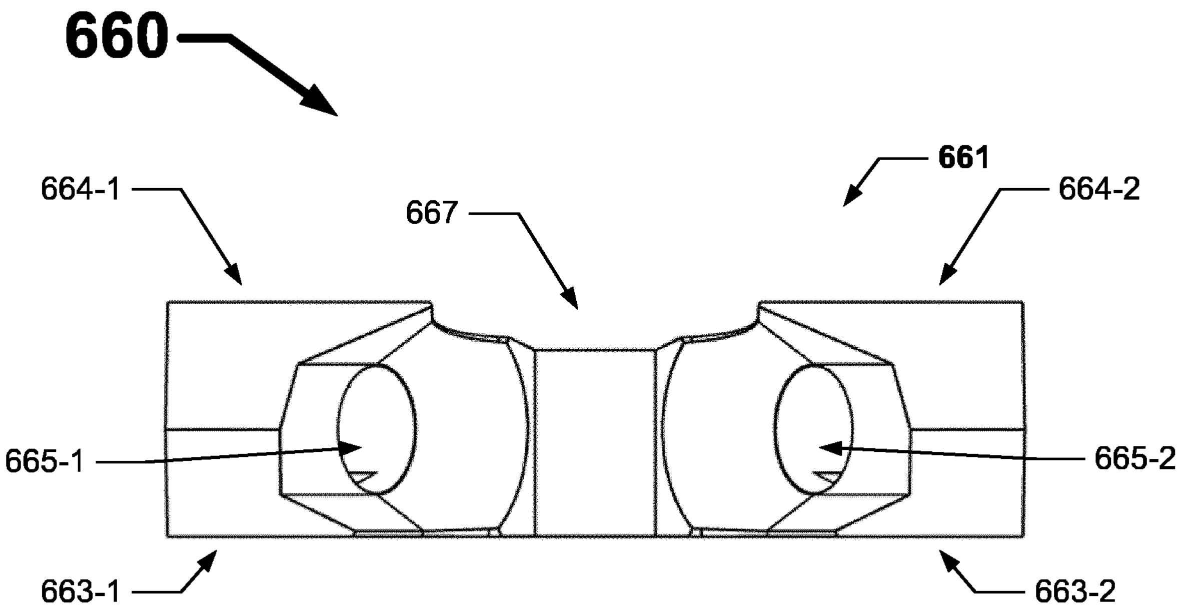
FIGS. 6A through 6E show various views of an anchor of the joining system of FIGS. 1A through 1I according to certain example embodiments.
Figure 6B:
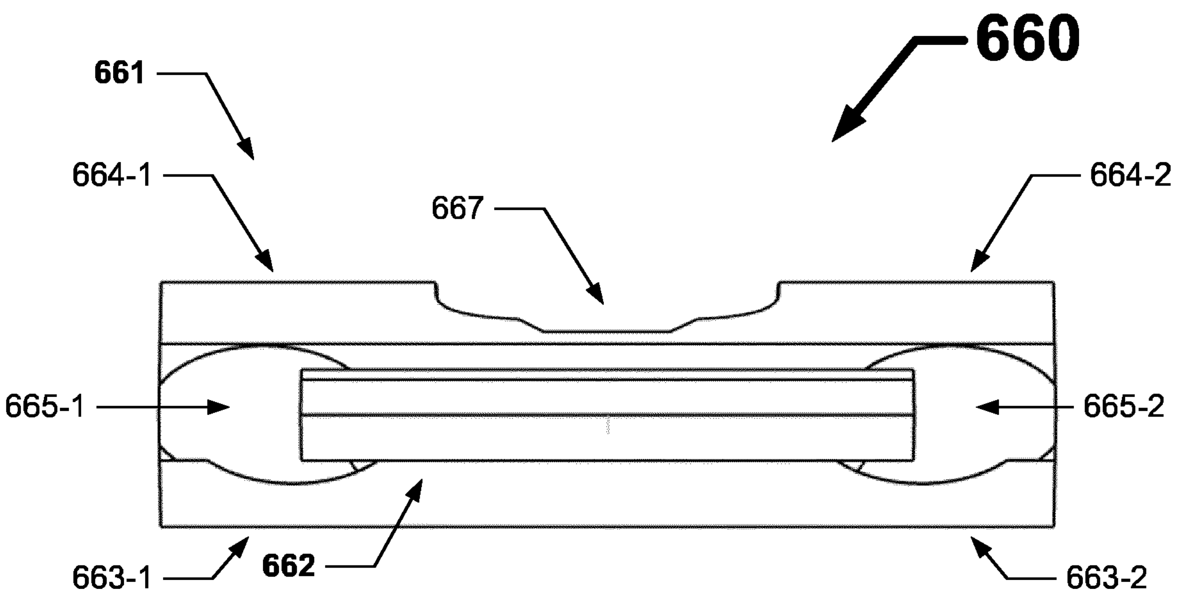
Figure 6C:
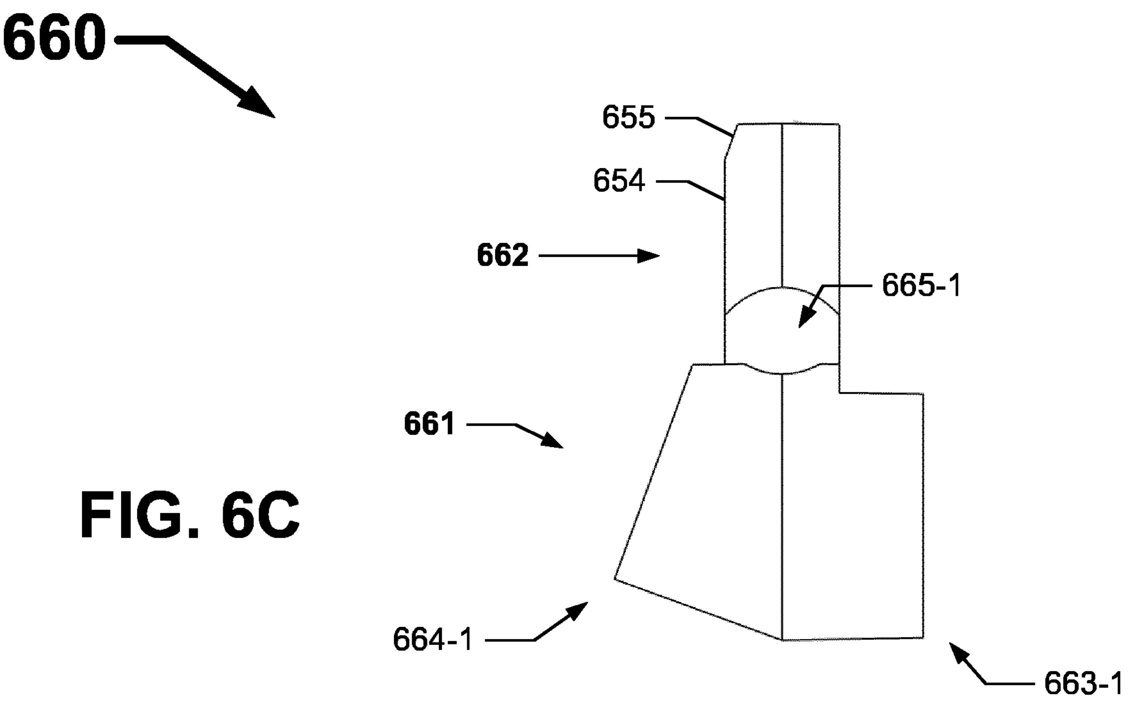
Figure 6D:
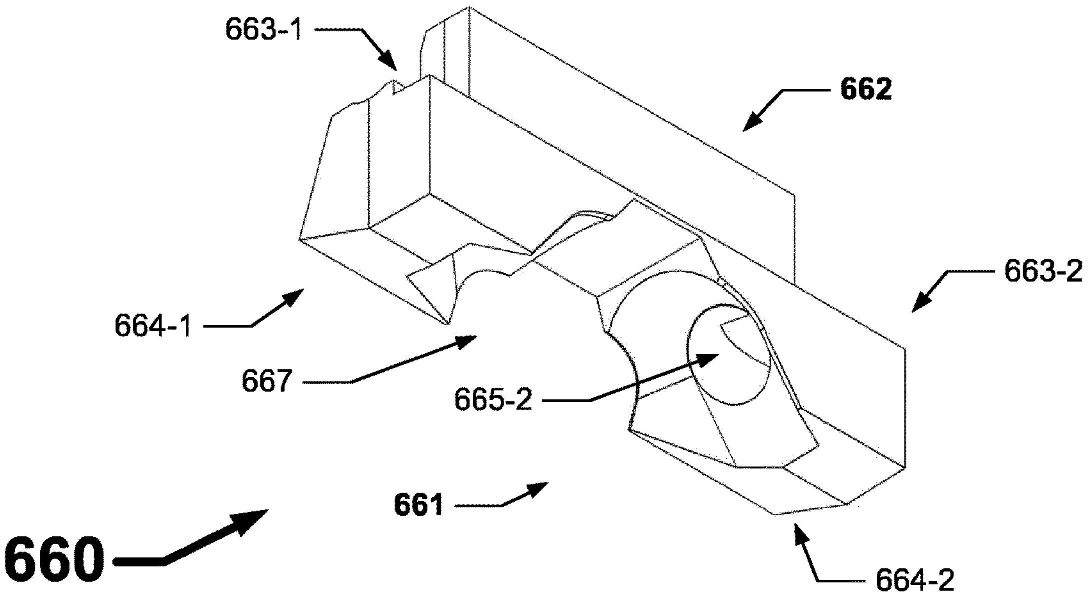
Figure 6E:
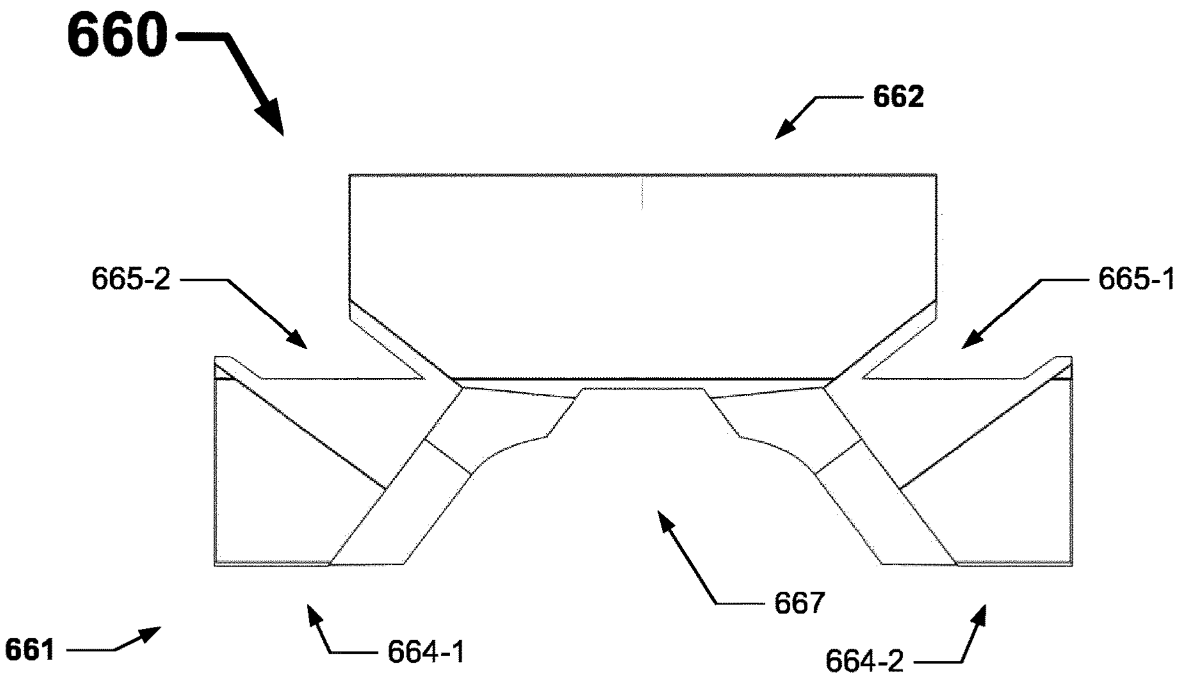

FIGS. 4A through 4C show various views of the bracket 440 of the joining system 195 of FIGS. 1A through 1I according to certain example embodiments. Specifically, FIG. 4A shows a top perspective view of the bracket 440. FIG. 4B shows a bottom perspective view of the bracket 440. FIG. 4C shows a side view of the bracket 440. FIG. 5 shows the pulling apparatus 550 of the joining system 195 of FIGS. 1A through 1I according to certain example embodiments. FIGS. 6A through 6E show various views of an anchor 660 of the joining system 195 of FIGS. 1A through 1I according to certain example embodiments. Specifically, FIG. 6A shows a bottom view of the anchor 660. FIG. 6B shows a top view of the anchor 660. FIG. 6C shows a side view of the anchor 660. FIG. 6D shows a bottom perspective view of the anchor 660. FIG. 6E shows a sectional front view of the anchor 660.

Figure 7A:
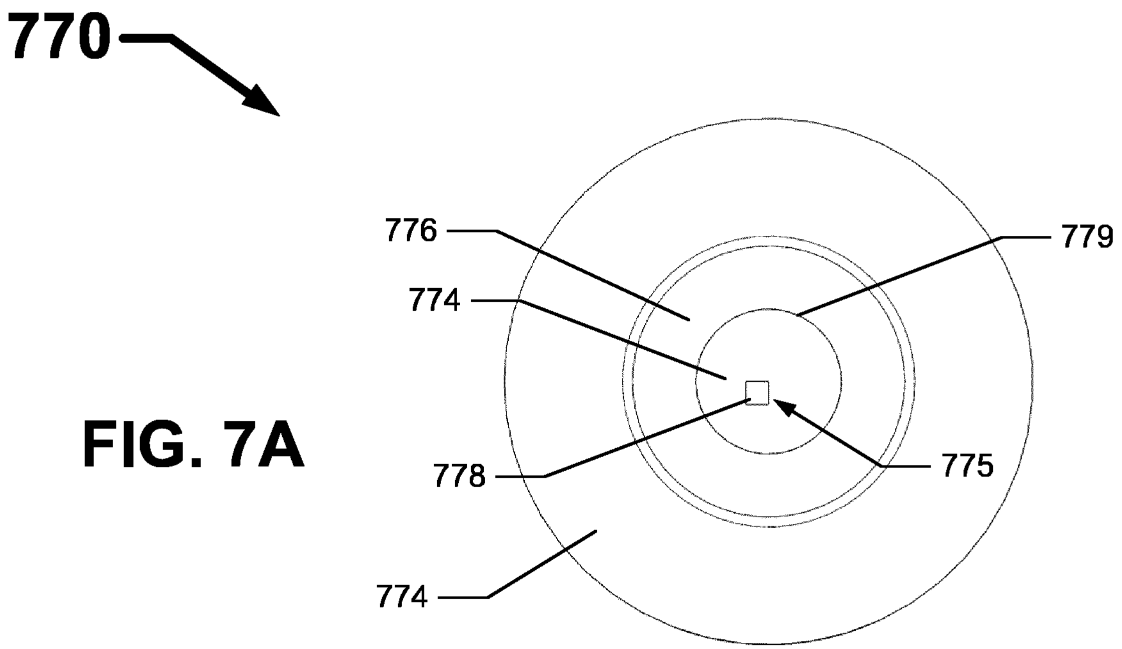
FIGS. 7A through 7D show the gripper of the joining system of FIGS. 1A through 1I according to certain example embodiments.
Figure 7B:
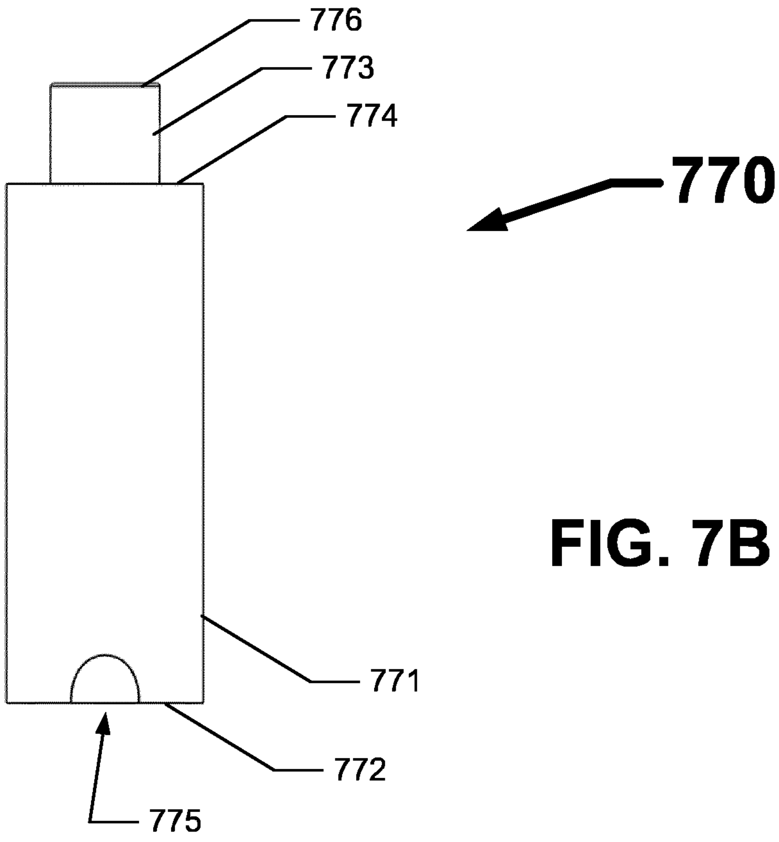
Figure 7C:
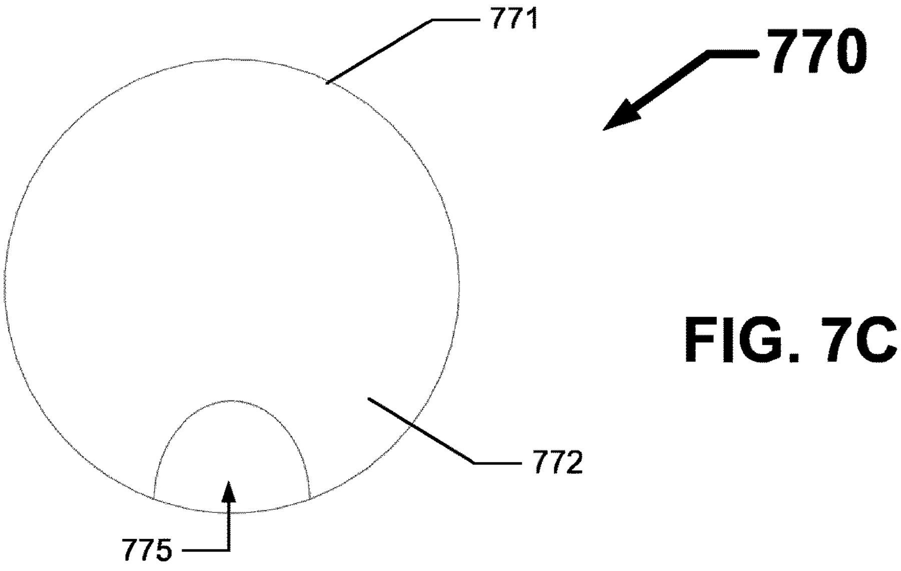
Figure 7D:
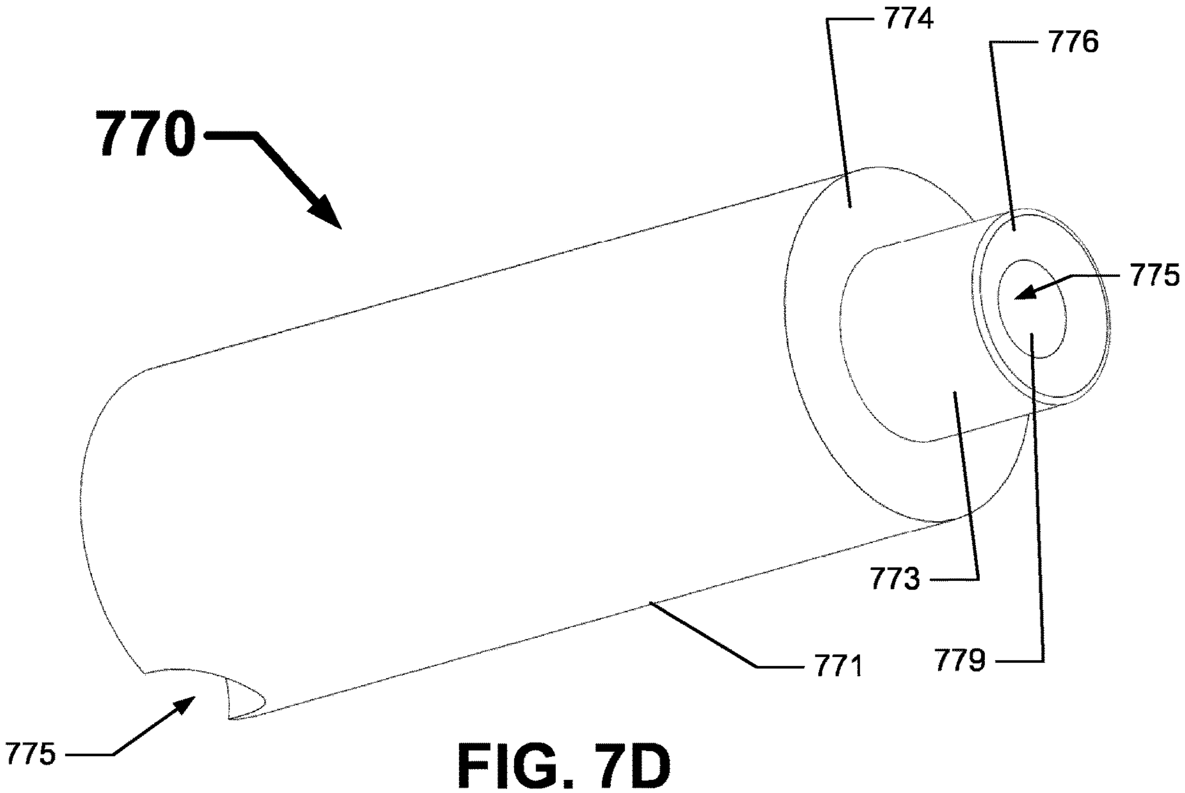
Figure 8A:
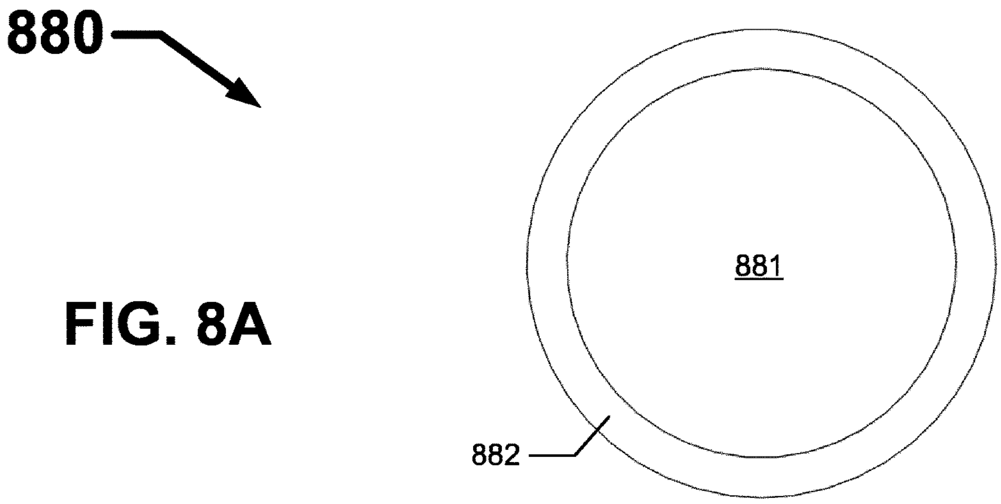
FIGS. 8A and 8B show a pin of the joining system of FIGS. 1A through 1I according to certain example embodiments.
Figure 8B:
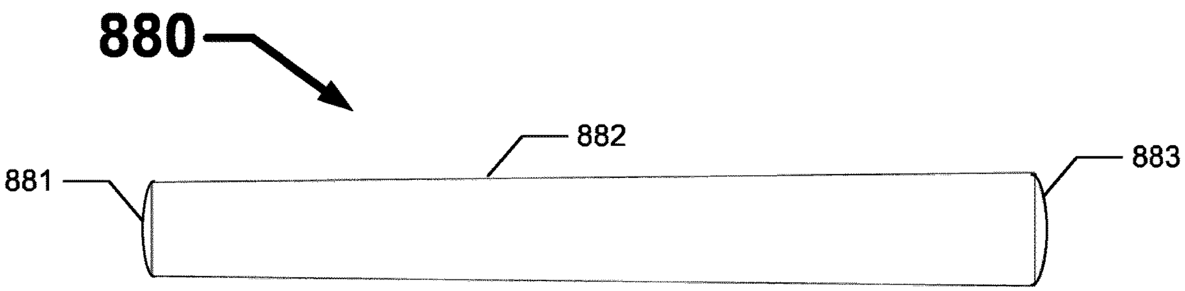

FIGS. 7A through 7D show the gripper 770 of the joining system 195 of FIGS. 1A through 1I according to certain example embodiments. Specifically, FIG. 7A shows a top view of the gripper 770. FIG. 7B shows a side view of the gripper 770. FIG. 7C shows a bottom view of the gripper 770. FIG. 7D shows a perspective view of the gripper 770. FIGS. 8A and 8B show a pin 880 of the joining system 195 of FIGS. 1A through 1I according to certain example embodiments. Specifically, FIG. 8A shows a front view of the pin 880. FIG. 8B shows a side view of the pin 880.

Referring to FIGS. 1A through 8B, the linear lighting system 100 in this example includes two linear light fixtures 190 (linear light fixture 190-1 and linear light fixture 190-2) that are being joined together using the example joining system 195. Each linear light fixture 190 includes a frame 220 and a tray 330. In this case, linear light fixture 190-1 includes frame 220-1 and tray 330-1, and linear light fixture 190-2 includes frame 220-2 and tray 330-2. Frame 220-1 and frame 220-2 are configured substantially the same as each other. Similarly, tray 330-1 and tray 330-2 are configured substantially the same as each other.

As shown in FIGS. 2A and 2B, each frame 220 of a linear light fixture 190 includes a top wall 227, a left side wall 223, and a right side wall 222. The space below the top wall 227 and between the left side wall 223 and the right side wall 222 forms a cavity 254 inside of which the tray 330 and most of the joining system 195 are disposed. In some cases, as in this example, the left side wall 223 and the right side wall 222 extend upward above the top wall 227. In such cases, the top surface of the top wall 227 and the tops of the left side wall 223 and the right side wall 222 forms a cavity 298. In this case, the top wall 227 and between the left side wall 223 and the right side wall 222 are substantially planar. Also, in this example, the top wall 227 is substantially perpendicular to the left side wall 223 and the right side wall 222. In alternative embodiments, the top wall 227, the left side wall 223, and/or the right side wall 222 can be non-planar (e.g., curved, made of multiple non-planar pieces). In addition, or in the alternative, the top wall 227 can form some non-perpendicular angle with respect to the left side wall 223 and/or the right side wall 222.

The top wall 227 of the frame 220 includes one or more features that can be used by the example joining system 195. For example, in this case, the bottom surface of the top wall 227 can have one or more protruding features 224 that can be used to receive and guide the frame receiving feature 445 (discussed below) of the bracket 440 of the joining system 195. The protruding features 224 can also be configured to receive one or more coupling features (e.g., fastening devices (e.g., screws), tabs) that allow the bracket 440 (e.g., using frame coupling features 444, discussed below) to be directly or indirectly fixedly coupled to the top wall 227 of the frame 220.

In certain example embodiments, the top wall 227 of the frame 220 can have an aperture 221 that traverses therethrough. In such a case, the aperture 221 can be positioned toward a distal end of the frame 220 (e.g., the end of frame 220-1 of linear light fixture 190-1 that abuts against the frame 220-2 of linear light fixture 190-2 when the two linear light fixtures 190 are joined together) and can be used to allow the proximal portion 551 of the pulling apparatus 550 (discussed below) to pass therethrough so that the proximal portion 551 of the pulling apparatus 550 can be pulled with a sufficiently large upward force to enable the joining system 195 and pull the linear light fixture 190-2 toward the linear light fixture 190-1 in proper alignment. In this case, the aperture 221 is disposed in a portion of the protruding features 224.

Similarly, the inner surface of the left side wall 223 and the inner surface of the right side wall 222 can include one or more of a number of features to accommodate one or more components of the joining system 195 and/or the tray 330. For example, the left side wall 223 can include protrusion 226, protrusion 229, slot 213-3, and slot 213-4 along its inner surface, with slot 213-4 also being formed by the inner surface of the top wall 227. Protrusion 226 and protrusion 229 can form a receiving space 212 for receiving an anchor 660 (e.g., anchor 660-1) and a distal end (e.g., distal end 335) of a tray 330, as shown in FIGS. 1F, 2A, and 3A. Slot 213-3 and slot 213-4 can each be configured to receive a pin 880 (e.g., pin 880-4 received by slot 213-3 and pin 880-3 received by slot 213-4), as shown in FIGS. 1F, 1H, 8A, and 8B.

Each of protrusion 226, protrusion 229, slot 213-3, and slot 213-4 can be configured to allow a portion of the joining system 195 or other part of the linear light fixture 190 to be fixedly or movably disposed therein. For instance, in this example, the distal end (in this case, the end that abuts against the frame 220-2 of linear light fixture 190-2 when the two linear light fixtures 190 are joined together) of the frame 220-1 for linear light fixture 190-1 can be configured such that slot 213-3 fixedly retains pin 880-4 and slot 213-4 fixedly retains pin 880-3 therein. Further, the distal end of the frame 220-1 for linear light fixture 190-1 can be configured such that protrusion 226 and protrusion 229 slidably receive an anchor 660.

By contrast, in this example, the proximal end (in this case, the end that abuts against the frame 220-1 of linear light fixture 190-1 when the two linear light fixtures 190 are joined together) of the frame 220-2 for linear light fixture 190-2 can be configured such that slot 213-3 slidably receives pin 880-4 and slot 213-4 slidably receives pin 880-3 therein. Further, the proximal end of the frame 220-2 for linear light fixture 190-2 can be configured such that protrusion 226 and protrusion 229 fixedly couple to an anchor 660.

The various features along the inner surface of the right side wall 222 can be substantially the same as (as in this example), or different than, the features along the inner surface of the left side wall 223. For example, the right side wall 222 can include protrusion 225, protrusion 228, slot 213-1, and slot 213-2 along its inner surface, with slot 213-2 also being formed by the inner surface of the top wall 227. Protrusion 225 and protrusion 228 can form a receiving space 211 for receiving an anchor 660 (e.g., anchor 660-2) and a distal end (e.g., distal end 333) of a tray 330, as shown in FIGS. 1F, 2A, and 3A. Slot 213-1 and slot 213-2 can each be configured to receive a pin 880 (e.g., pin 880-1 received by slot 213-1 and pin 880-2 received by slot 213-2), as shown in FIGS. 1F, 1H, 8A, and 8B.

Each of protrusion 225, protrusion 228, slot 213-1, and slot 213-2 can be configured to allow a portion of the joining system 195 or other part of the linear light fixture 190 to be fixedly or movably disposed therein. For instance, in this example, the distal end (in this case, the end that abuts against the frame 220-2 of linear light fixture 190-2 when the two linear light fixtures 190 are joined together) of the frame 220-1 for linear light fixture 190-1 can be configured such that slot 213-1 fixedly retains pin 880-1 and slot 213-2 fixedly retains pin 880-2 therein. Further, the distal end of the frame 220-1 for linear light fixture 190-1 can be configured such that protrusion 225 and protrusion 228 slidably receive an anchor 660.

By contrast, in this example, the proximal end (in this case, the end that abuts against the frame 220-1 of linear light fixture 190-1 when the two linear light fixtures 190 are joined together) of the frame 220-2 for linear light fixture 190-2 can be configured such that slot 213-1 slidably receives pin 880-1 and slot 213-2 slidably receives pin 880-2 therein. Further, the proximal end of the frame 220-2 for linear light fixture 190-2 can be configured such that protrusion 225 and protrusion 228 fixedly couple to an anchor 660.

As shown in FIGS. 3A and 3B, each tray 330 of a linear light fixture 190 includes a top wall 331, a left side wall 334, and a right side wall 332. The space below the top wall 331 and between the left side wall 334 and the right side wall 332 forms a cavity 338 inside of which various components (e.g., circuit boards, light sources) of the linear light fixture 190 can be located (but are not shown here). The distal end 335 of the left side wall 334 in this example has a general hook shape to engage a protrusion (e.g., protrusion 226) of the frame 220 and/or an anchor 660. Similarly, the distal end 333 of the left side wall 332 in this example has a general hook shape to engage a protrusion (e.g., protrusion 225) of the frame 220 and/or an anchor 660.

In this case, the top wall 331, the left side wall 334, and the right side wall 332 are substantially planar. Also, in this example, the left side wall 334 and the top wall 331 of the tray 330 form an obtuse angle 337, and the right side wall 332 and the top wall 331 of the tray 330 form an obtuse angle 336. The angle 337 and the angle 336 can be the same or different from each other. In alternative embodiments, the top wall 331, the left side wall 334, and/or the right side wall 332 can be non-planar (e.g., curved, made of multiple non-planar pieces). In addition, or in the alternative, the angle 337 and/or the angle 336 can be acute or perpendicular rather than obtuse.

In this case, the various components of an example joining system 195 are located outside the cavity 338 formed by the walls of the tray 330. In other words, the various components of a joining system 195 are located above the top surfaces of the top wall 331, the left side wall 334, and the right side wall 332 of the tray 330 within the cavity 254 formed by the frame 220.

Turning to the example joining system 195 of the lighting system 100, the joining system 195 in this example includes the bracket 440, the pulling apparatus 550, two anchors 660, the gripper 770, and four pins 880. The bracket 440 shown in FIGS. 4A through 4C includes a body 443 with an extension 441 at its proximal end, a pulling apparatus receiving feature 442 disposed in the extension 441, a frame receiving feature 445 in the form of extension 446 and extension 447 that each extends upward from either side of the body 443 along the length of the body 443, and one or more frame coupling features 444 (in this case, frame coupling feature 444-1 and frame coupling feature 444-2).

The body 443 and the extension 441 in this case are planar. In alternative embodiments, the body 443 and/or the extension 441 can be non-planar (e.g., curved, made of multiple non-planar pieces). The body 443 and the extension 441 form an angle 449 between them. In this case, the angle 449 is obtuse. In alternative embodiments, the angle 449 can be acute, or the body 443 and the extension 441 can be planar with each other. The angle 449 can be set to help reduce the amount of sufficient pulling force on the proximal end of the proximal portion 551 of the pulling apparatus 550 to join the linear light fixture 190-2 to the linear light fixture 190-1.

The pulling apparatus receiving feature 442 disposed in the extension 441 is configured to slidably couple, directly or indirectly, to the proximal portion 551 of the pulling apparatus 550. The pulling apparatus receiving feature 442 can take any of a number of forms. For example, in this case, the pulling apparatus receiving feature 442 can be an aperture that traverses the thickness of the extension 441. In some cases, the proximal portion 551 of the pulling apparatus 550 can be disposed directly within the pulling apparatus receiving feature 442. In alternative embodiments, as in this example (shown in FIGS. 1D and 1F), the proximal portion 551 of the pulling apparatus 550 is disposed directly within the gripper 770, which is fixedly disposed in the pulling apparatus receiving feature 442.

As discussed above, the frame receiving feature 445 in this case is in the form of extension 446 and extension 447 that each extends upward (e.g., perpendicularly) from either side of the body 443 along the length of the body 443. The extension 446, the extension 447, and the body 443 form a channel 448 in which the frame 220 (and, more specifically, the one or more protruding features 224 that extend from the bottom surface of the top wall 227 of the frame 220) of a linear light fixture 190 to be joined can slide. In this example, the protruding features 224 of the frame 220-2 of linear light fixture 190-2 is configured to slide within the channel 448 as the linear light fixture 190-2 is pulled toward the linear light fixture 190-1 when a sufficiently large upward force (e.g., applied by a user) pulls the distal end of the distal portion 551 of the pulling apparatus 550.

The one or more frame coupling features 444 of the bracket 440 are configured to fixedly couple to the frame 220 of one of the linear light fixtures 190. In this example, the frame coupling features 444 of the bracket 440 are configured to fixedly couple to the frame 220-1 of the linear light fixture 190-1. Each frame coupling feature 444 can have any of a number of configurations to allow the frame coupling feature 444 to couple, directly or indirectly, to the frame 220 of a linear light fixture 190. In this case, frame coupling feature 444-1 and frame coupling feature 444-2 are in the form of apertures that traverse the thickness of the body 443 of the bracket 440. In this way, an independent coupling feature (e.g., a screw) can be used to engage a frame coupling feature 444 and a complementary coupling feature (e.g., a recess) in the top wall 227 of the frame 220.

With this configuration, the body 443 of the bracket 440 has a length sufficient to have its distal end within the cavity 254 formed by the frame 220 (in this case, frame 220-1) of one linear light fixture 190 (in this example, linear light fixture 190-1, which is secured to a structure) while its proximal end extends beyond the frame 220-1 to slidably engage the frame 220 (in this case, frame 220-2) of the linear light fixture 190 (in this case, linear light fixture 190-2) being added to the linear lighting system 100.

The pulling apparatus 550 of the joining system 195 is configured to act as the mechanism that pulls the linear light fixture 190 being joined to the linear lighting system 100 when a sufficient upward force is applied to its proximal portion. The pulling apparatus 550 can have any of a number of configurations. For example, in this case, the pulling apparatus 550 has a Y configuration, where the proximal portion 551 forms the base of the Y, one distal portion 552-1 forms one line in the fork of the Y, and another distal portion 552-2 forms the other line in the fork of the Y. In certain example embodiments, the pulling apparatus 550 is made of a material that does not stretch when a pulling force is applied to it. For example, the pulling apparatus 550 can be, or be made from the same material as, an aircraft cable.

The proximal portion 551 of the pulling apparatus 550 can be configured to be pulled with sufficient force to pull one linear light fixture 190 (e.g., linear light fixture 190-2) toward another linear light fixture 190 (e.g., linear light fixture 190-1). For example, the proximal portion 551 of the pulling apparatus 550 can have a length sufficient to extend through the gripper 770, through the aperture 221 in the top wall 227 in the frame 220, and beyond the cavity 298 at the top of the frame 220.

Each of the distal portions 552 (in this case, distal portion 552-1 and distal portion 552-2) of the pulling apparatus 550 can be configured to couple to an anchor 660 that is fixedly coupled to the linear light fixture 190 (e.g., linear light fixture 190-2) that is being joined to the linear lighting system 100 (which includes linear light fixture 190-1), which can be anchored to a structure (e.g., a ceiling). The proximal portion 551 and any distal portions 552 can share a tie point 556. Some or all portions of the pulling apparatus 550 can be rigid. In addition, or in the alternative, some or all portions of the pulling apparatus 550 can be bendable.

An anchor 660 of the joining system 195 can be configured to serve multiple purposes. For one, an anchor 660 can be configured to be fixedly coupled to the linear light fixture 190 (e.g., linear light fixture 190-2) that is being joined to the linear lighting system 100. For another, an anchor 660 can be configured to be slidably coupled to the linear light fixture 190 (e.g., linear light fixture 190-1) that is already joined to the linear lighting system 100. For yet another, an anchor 660 can be configured to be fixedly coupled to a distal end of a distal portion 552 of the pulling apparatus 550.

As discussed above, an example joining system 195 can include multiple anchors 660. In such a case, the configuration of one anchor 660 (e.g., anchor 660-1) can be identical to, or differ from, the configuration of one or more of the other anchors 660 in the joining system 195. In this example, anchor 660-1 and anchor 660-2 are configured identically to each other.

An anchor 660 can have any of a number of configurations suitable for performing the functions of the anchor 660 discussed above. In this example, the anchor 660 of FIGS. 6A through 6E has an upper portion 662 and a lower portion 661. In this case, the upper portion 662 has a length, a width, and a height that is less than the length, the width, and the height of the lower portion 661. The upper portion 662 substantially forms a rectangular cuboid with a chamfered edge 655 along the top of the rear surface 654.

The lower portion 661 in this case includes a left front section 663-1, a right front section 663-2, a left rear section 664-1, and a right rear section 664-2. The left front section 663-1 and the right front section 663-2 each substantially forms a rectangular cuboid, and the left rear section 664-1 and the right rear section 664-2 each substantially forms a cuboid with non-normal angles. The front sections 663 abut against the rear sections 664. The left front section 663-1 and the left rear section 664-1 are separated from the right front section 663-2 and the right rear section 664-2 by a gap 667.

In addition, there is a channel 665-1 that traverses the left front section 663-1 and the left rear section 664-1. The channel 665-1 traverses along a diagonal, starting at the top and toward the outside of the lower portion 661 and ending at the gap 667. Similarly, there is a channel 665-2 that traverses the right front section 663-2 and the right rear section 664-2. The channel 665-2 traverses along a diagonal, starting at the top and toward the outside of the lower portion 661 and ending at the gap 667. The channels 665 have substantially the same characteristics (e.g., are tubular in shape with the same diameter and length). In alternative embodiments, one or more of the characteristics of one channel 665 can differ from one or more of the corresponding characteristics of the other channel 665.

The upper portion 662 of the anchor is configured to engage with one or more protrusions of multiple frames 220. In this case, as shown in FIGS. 1F, 1H, 2A, and 6A through 6E, one side of the upper portion 662 of anchor 660-1 engages (e.g., is disposed within, is coupled to) protrusion 225 of the frame 220-1 of one linear light fixture 190-1, and the opposite side of the upper portion 662 of anchor 660-1 engages (e.g., is disposed within, is directly or indirectly coupled to) protrusion 225 of the frame 220-2 of another linear light fixture 190-2. Similarly, one side of the upper portion 662 of anchor 660-2 engages (e.g., is disposed within, is coupled to) protrusion 226 of the frame 220-1 of one linear light fixture 190-1, and the opposite side of the upper portion 662 of anchor 660-2 engages (e.g., is disposed within, is directly or indirectly coupled to) protrusion 226 of the frame 220-2 of another linear light fixture 190-2.

Similarly, at least part of the lower portion 661 of the anchor 660 is configured to engage with one or more protrusions of multiple frames 220. In this case, as shown in FIGS. 1F, 1H, 2A, and 6A through 6E, one rear section 664 (e.g., the right rear section 664-2) of the lower portion 661 of anchor 660-1 engages (e.g., is disposed within, is coupled to) protrusion 228 of the frame 220-1 of one linear light fixture 190-1, and the other rear section 664 (the left rear section 664-1) of the lower portion 661 of anchor 660-1 engages (e.g., is disposed within, is directly or indirectly coupled to) protrusion 229 of the frame 220-2 of another linear light fixture 190-2. Similarly, one rear section 664 (e.g., the left rear section 664-1) of the lower portion 661 of anchor 660-2 engages (e.g., is disposed within, is coupled to) protrusion 229 of the frame 220-1 of one linear light fixture 190-1, and the other rear section 664 (e.g., right rear section 664-2) of the lower portion 661 of anchor 660-2 engages (e.g., is disposed within, is directly or indirectly coupled to) protrusion 229 of the frame 220-2 of another linear light fixture 190-2.

In this way, the proximal half of anchor 660-1 can be slidably disposed in the distal part of the receiving space 211 of the frame 220-1 of linear light fixture 190-1, and the distal half of anchor 660-1 can be fixedly disposed in the proximal part of the receiving space 211 of the frame 220-2 of linear light fixture 190-2. Similarly, the proximal half of anchor 660-2 can be slidably disposed in the distal part of the receiving space 212 of the frame 220-1 of linear light fixture 190-1, and the distal half of anchor 660-2 can be fixedly disposed in the proximal part of the receiving space 212 of the frame 220-2 of linear light fixture 190-2.

The channels 665 that traverse an anchor 660 can be used for one or more of a number of purposes. For example, a channel 665 that traverses an anchor 660 can be used to receive an independent coupling feature (e.g., a screw, a rivet) to fixedly couple the anchor 660 to the frame 220. As another example, a channel 665 that traverses an anchor 660 can be used to receive the distal end of a distal portion 552 of the pulling apparatus 550. In such a case, the channel 665 can be called a pulling apparatus coupling feature 665.

The gripper 770 is another component of the joining system 195. The gripper 770 can be configured to serve multiple purposes. For one, the gripper 770 can be configured to help guide the proximal portion 551 of the pulling apparatus 550 as the proximal end of the proximal portion 551 is pulled (e.g., by a user) as the joining system 195 is being implemented to lengthen the linear lighting system 100. For another, the gripper 770 can be configured to have a ratcheting type of capability that prevents the pulling apparatus 550 from being released or otherwise retracted therethrough. In other words, the gripper 770 can be configured to prevent or greatly reduce slack from forming in the pulling apparatus 550 between the gripper 770 and the anchors 660.

The gripper 770 can have any of a number of configurations suitable for performing the functions of the gripper 770 discussed above. In this example, the gripper 770 of FIGS. 7A through 7D has a channel 775 disposed therein that traverses the length of the gripper 770. Also in this example, the gripper 770 has cylindrical main body 771 and a relatively smaller (e.g., shorter, smaller diameter) cylindrical extension 773 that extends from the distal wall 774 of the main body 771 to its top surface 776. In alternative embodiments, the main body 771 and the extension 773 can have any of a number of other characteristics (e.g., different cross-sectional shape when viewed from above, different length). In some cases, the top surface 776 of the cylindrical extension 773 can be rounded or smoothed to avoid cutting into the pulling apparatus 550.

The channel 775 has one end at the distal end of the extension 773. The inner wall 779 of the extension 773 defines the portion of the channel 775 within the extension 773. When the channel 775 transitions from the extension 773 to the main body 771, the width of the channel 775, defined by inner wall 778, becomes smaller than the width of the channel 775 within the extension 773. Also, the cross-sectional shape of the channel 775 when viewed from above at this point is square. By contrast, at the proximal end of the main body 771, the width of the channel 775 at the proximal wall 772 is larger than the width of the channel 775 within the extension 773. In this case, part of the channel 775 at the proximal end is defined in the side wall of the main body 771. In this way, the center axis of the channel 775 can be different than the center axis of the main body 771. Put another way, the channel 775 in the gripper 770 deviates from a center axis along a length of the gripper 770. Also, the cross-sectional shape of the channel 775 at the proximal end of the main body 771 along its center axis is circular.

In certain example embodiments, the gripper 770 can include a component or mechanism (e.g., a ratcheting system with a unidirectional locking gear) that would allow the proximal portion 551 of the pulling apparatus 550 to be pulled away from the linear light fixture 190-2 and through the aperture 221 in the top wall 227 of the frame 220-1 of the linear light fixture 190-1 while also preventing the pulling apparatus 550 to be pulled in the opposite direction. In such a case, the component or mechanism can also include a release that would allow the pulling apparatus 550 to be pulled in the opposite direction (in this example, toward the linear light fixture 190-2).

In some cases, the gripper 770 can include one or more coupling features (e.g., an aperture that traverses the main body 771, mating threads disposed on the outer surface of the main body 771 toward the proximal end of the main body 771) that can be configured to complement one or more coupling features on the extension 441 of the bracket 440. In this way, the gripper 770 can be directly or indirectly coupled to the extension 441 of the bracket 440. In alternative embodiments, the gripper 770 can be positioned at other locations (e.g., above the aperture 221 in the frame 220) with respect to a linear light fixture 190 and/or the linear lighting system 100.

A pin 880 is an optional component of the joining system 195. As discussed above, the example joining system 195 can include none, one, or multiple pins 880. A pin 880 can be configured to serve one or more purposes. For example, a pin 880 can be configured to be coupled (e.g., fixedly, slidably) to the linear light fixture 190 (e.g., linear light fixture 190-2) that is being joined to the linear lighting system 100. For another, a pin 880 can be configured to be coupled (e.g., slidably, fixedly) to the linear light fixture 190 (e.g., linear light fixture 190-1) that is already joined to the linear lighting system 100. In this way, a pin 880 can complement the one or more anchors 660 that are part of the joining system 195. Any pins 880 that are part of the joining system can be positioned at different locations around the end of a frame 220 relative to the locations of the anchors 660 to help stabilize and secure the overall coupling between the linear light fixtures 190 being joined to each other.

A pin 880 can have any of a number of configurations. For example, in this case, a pin 880 can be somewhat conically shaped or a tapered cylinder. Specifically, in this example, the pin 880 of FIGS. 8A and 8B have a body 882 that is bounded by one end 881 and an opposite end 883. The diameter of end 883 is greater than the diameter of end 881, which results in the body 882 being tapered. Also, end 881 and end 883 are rounded, making it easier for the pin to be received by a slot (e.g., slot 213-3, slot 213-4) in the frame 220 of a linear light fixture 190. With the configuration of the pin 880 shown in FIGS. 8A and 8B, end 883 (the end having the larger diameter) can be inserted manually (e.g., by a user) into a slot in the frame 220 of one linear light fixture 190 being joined. This leaves end 881, having the smaller diameter, extending beyond that frame 220 to be received by the corresponding slot of the frame 220 of the other linear light fixture 190 being joined.

In alternative embodiments, a pin 880 can be cylindrical without any tapering in the body 882. In addition, or in the alternative, a pin 880 can have end 881 and/or end 883 not be rounded. When the joining system 195 has multiple pins 880, the configuration (e.g., length, tapering, diameter of each end) of one pin 880 can be the same as, or different than, the configuration of one or more other pins 880 in the joining system 195. In some cases, a slot 213 can include a detent or other feature to act as a stop that limits the amount that a pin 880 can be inserted into the slot 213.

As a detailed example of how the various components of the joining system 195 can be used to join two linear light fixtures 190 as set forth in FIGS. 1A through 8B, linear light fixture 190-1 can be attached to a fixture (e.g., a ceiling), and linear light fixture 190-2 is being joined to linear light fixture 190-1. A user can fixedly couple the bracket 440 to the distal end of the bottom surface of the top wall 227 of the frame 220-1 of the linear light fixture 190-1. Before doing so, the gripper 770 can be directly or indirectly coupled to the extension 441 of the bracket 440.

In addition, the distal end of anchor 660-1 can be fixedly disposed into the proximal part of the receiving space 211 of the frame 220-2 of linear light fixture 190-2, and the distal half of anchor 660-2 can be fixedly disposed in the proximal part of the receiving space 212 of the frame 220-2 of linear light fixture 190-2. Either before or after this step is performed, the distal end of the distal portion 552-1 of the pulling apparatus 550 can be fixedly coupled to one of the channels 665 (channel 665-1, also called pulling apparatus coupling feature 665-1) of the anchor 660-1. Similarly, the distal end of the distal portion 552-2 of the pulling apparatus 550 can be fixedly coupled to one of the channels 665 (channel 665-2, also called pulling apparatus coupling feature 665-2) of the anchor 660-2.

Each of the pins 880 can be inserted into one of the slots 213 in the frame 220 of either linear light fixture 190-1 or linear light fixture 190-2. For example, end 883 of pin 880-1 can be inserted into slot 213-1 at the distal end of the frame 220-1 of the linear light fixture 190-1 so that the end 881 of pin 880-1 extends beyond the distal end of the frame 220-1. End 883 of pin 880-2 can be inserted into slot 213-2 at the distal end of the frame 220-2 of the linear light fixture 190-2 so that the end 881 of pin 880-2 extends beyond the distal end of the frame 220-2. End 883 of pin 880-3 can be inserted into slot 213-3 at the distal end of the frame 220-2 of the linear light fixture 190-2 so that the end 881 of pin 880-3 extends beyond the distal end of the frame 220-3. End 883 of pin 880-4 can be inserted into slot 213-4 at the distal end of the frame 220-1 of the linear light fixture 190-1 so that the end 881 of pin 880-4 extends beyond the distal end of the frame 220-1.

When the preceding steps are complete, the distal end of the bracket 440, extending beyond the distal end of the frame 220-1 of linear light fixture 190-1, can be positioned below the bottom surface of the top wall 227 of the frame 220-2 of linear light fixture 190-2. Then, the proximal end of the proximal portion 551 of the pulling apparatus 550 can be inserted through the channel 775 of the gripper 770, entering the extension 773 and exiting the main body 771. After the proximal end of the proximal portion 551 of the pulling apparatus 550 exits the channel 775 of the gripper 770, the proximal end of the proximal portion 551 of the pulling apparatus 550 can be pulled through the aperture 221 in the frame 220-1 of linear light fixture 190-1.

When a sufficient upward force is applied to the proximal end of the proximal portion 551 of the pulling apparatus 550, linear light fixture 190-2 slides along the bracket 440 toward linear light fixture 190-1. As linear light fixture 190-2 approaches linear light fixture 190-1, the proximal end of anchor 660-1 engages the distal ends of protrusion 225 and protrusion 228 of the frame 220-1 of linear light fixture 190-1, thereby filling the distal end of the receiving space 211 of the frame 220-1 of linear light fixture 190-1. Similarly, the proximal end of anchor 660-2 engages the distal ends of protrusion 226 and protrusion 229 of the frame 220-1 of linear light fixture 190-1, thereby filling the distal end of the receiving space 212 of the frame 220-1 of linear light fixture 190-1.

At about the same time, the extended ends 881 of the pins 880 are received by the corresponding slots 213 of the frame 220 of the other linear lighting fixture 190. In this example, end 881 of pin 880-1 slides into slot 213-1 at the proximal end of the frame 220-2 of the linear light fixture 190-2 as linear light fixture 190-2 is pulled toward linear light fixture 190-1 using the joining system 195. End 883 of pin 880-2 slides into slot 213-2 at the distal end of the frame 220-1 of the linear light fixture 190-1 as linear light fixture 190-2 is pulled toward linear light fixture 190-1 using the joining system 195. End 883 of pin 880-3 slides into slot 213-3 at the distal end of the frame 220-1 of the linear light fixture 190-1 as linear light fixture 190-2 is pulled toward linear light fixture 190-1 using the joining system 195. End 883 of pin 880-4 can be inserted into slot 213-4 at the proximal end of the frame 220-2 of the linear light fixture 190-2 as linear light fixture 190-2 is pulled toward linear light fixture 190-1 using the joining system 195.

Eventually, the proximal end of the frame 220-2 of linear light fixture 190-2, guided by the various components (e.g., the pins 880, the bracket 440, the anchors 660) of the joining system 195, abuts against the distal end of the frame 220-1 of linear light fixture 190-1. In this way, the joining system 195 significantly reduces or eliminates any light leakage between linear light fixture 190-1 and linear light fixture 190-2 of the linear lighting system 100.

In certain example embodiments, using the joining system 195 to join linear light fixture 190-1 and linear light fixture 190-2 in the linear lighting system 100 does not interfere with any other aspect of installing linear light fixture 190-2. For example, any wiring connections and pulling of electrical wires within and/or through the cavity 254 of the frame 220-2 of linear light fixture 190-2 can be performed when the various components of the joining system 195 are coupled to the frame 220-2 of the linear light fixture 190-2 and before the linear light fixture 190-2 is pulled toward the linear light fixture 190-1 to join the two together.

In certain example embodiments, the various components (e.g., the bracket 440, the anchors 660, the pins 550) of the example joining system 195 can be installed without the use of a tool. In addition, or in the alternative, adjacent linear light fixtures 190 can be joined using the example joining system 195 without using tools. In addition, or in the alternative, adjacent linear light fixtures 190 that have been joined using an example joining system 195 can be separated from each other without using tools.

Figure 9:
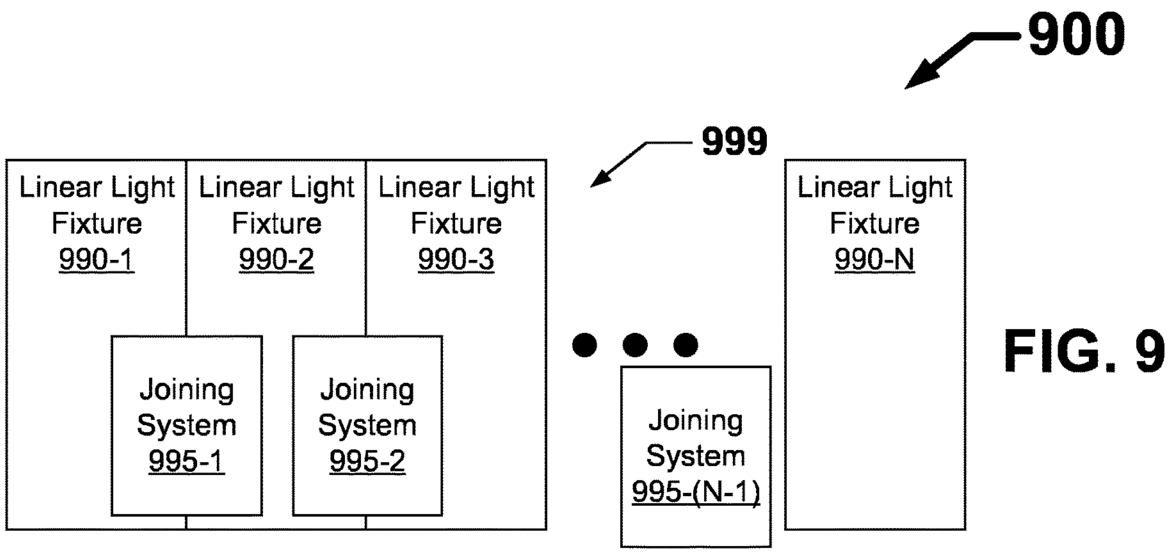
FIG. 9 shows a block diagram of another linear lighting system according to certain example embodiments.

FIG. 9 shows a block diagram of another linear lighting system 900 according to certain example embodiments. Referring to FIGS. 1A through 9, the linear lighting system 900 of FIG. 9 includes multiple linear light fixtures 990 (e.g., linear light fixture 990-1, linear light fixture 990-2, linear light fixture 990-3, linear light fixture 990-N) and multiple joining systems 995 (e.g., joining system 995-1, joining system 995-2, joining system 995-(N−1)). The linear light fixtures 990 and the joining systems 995 of the linear lighting system 900 of FIG. 9 are substantially the same as the linear light fixtures 190 and the joining system 195 discussed above with respect to FIGS. 1 through 8B.

In this example, the distal end of linear light fixture 990-1 and proximal end of linear light fixture 990-2 are joined using joining system 995-1. Also, the distal end of linear light fixture 990-2 and the proximal end of linear light fixture 990-3 are joined using joining system 995-2. The joining of linear light fixture 990-1, linear light fixture 990-2, and linear light fixture 990-3 using joining system 995-1 and joining system 995-2 forms a linear luminaire 999, which can continue to be expanded using additional example joining systems 995. In this example, the linear luminaire 999 can be expanded to include N linear light fixtures 990, which will require the use of N−1 example joining systems 995.

In some cases, if adjacent linear light fixtures 990 of a linear luminaire 999 need to be separated (e.g., for maintenance, to replace a component of a linear light fixture 990), example joining systems can be configured to allow for such separation without the use of tools. When the reason for separating the previously joined linear light fixtures 990 has been addressed, the linear light fixture 990 can be rejoined by applying the same sufficient pulling force to the distal end of the distal portion 551 of the pulling apparatus 550 as what was used for the initial joining of the linear light fixtures 990. The rejoining can be achieved with little or no adjustment or resetting of the pins 880, the anchors 660, and/or the gripper 770. This process of separating and rejoining adjacent linear light fixtures 990 can be repeated multiple times without reducing the effectiveness of the example joining system 995 in significantly reducing or eliminating light leakage between the joined linear light fixtures 990.

Example embodiments can be used to allow two linear light fixtures to be joined to each other end-to-end in such a way that light leakage between them is significantly reduced or eliminated. Example embodiments can be utilized when one of these linear light fixtures is installed with respect to a structure (e.g., a ceiling) and the other linear light fixture is being wired for integration into the resulting linear luminaire. Example embodiments can be used with linear light fixtures having any of a number of sizes and/or features. Example embodiments can be installed and implemented without the use of tools. Example embodiments can be used in new installations of linear light fixtures as well as retrofitting existing linear light fixtures. Example embodiments also provide a number of other benefits. Such other benefits can include, but are not limited to, increased ease of maintenance, greater ease of use, catering to user preferences, modularity, ease of installation, and compliance with industry standards that apply to linear light fixtures and resulting linear luminaires when those linear light fixtures are joined to each other.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

The invention claimed is:

1. A joining system for joining adjacent light fixtures, the joining system comprising:

a pulling apparatus comprising a proximal portion, a first distal portion, and a second distal portion;

a bracket configured to be coupled to a frame of a first light fixture, wherein the bracket comprises a frame receiving feature and a pulling apparatus receiving feature, wherein the frame receiving feature is configured to be slidably coupled to the frame of a second light fixture, and wherein the pulling apparatus receiving feature is configured to slidably couple to the proximal portion of the pulling apparatus;

a first anchor configured to be coupled to the frame of the second light fixture, wherein the first anchor comprises a first pulling apparatus coupling feature that is configured to couple to the first distal portion of the pulling apparatus;

a second anchor configured to be coupled to the frame of the second light fixture, wherein the second anchor comprises a second pulling apparatus coupling feature that is configured to couple to the second distal portion of the pulling apparatus; and a gripper coupled to the pulling apparatus receiving feature of the bracket, wherein the gripper comprises a channel that passes therethrough, and wherein the channel is configured to have the proximal portion of the pulling apparatus slidably disposed therein.

2. The joining system of claim 1, wherein the pulling apparatus comprises an aircraft cable arranged in a Y configuration.

3. The joining system of claim 1, wherein the first frame of the first light fixture is configured to receive part of the first anchor and the second anchor as the second light fixture is pulled toward the first light fixture.

4. The joining system of claim 1, further comprising:

a pin comprising a proximal end that is configured to couple to the first frame of the first light fixture and a distal end that is configured to couple to the second frame of the second light fixture.

5. The joining system of claim 1, wherein a distal end of the distal portion of the pulling apparatus is configured to traverse through an aperture in a top wall of the frame of the first light fixture, and wherein the second light fixture is pulled along the bracket toward the first light fixture when a sufficiently large upward force pulls the distal end of the distal portion of the pulling apparatus.

6. The joining system of claim 1, wherein the channel in the gripper deviates from a center axis along a length of the gripper.

7. The joining system of claim 1, wherein the bracket comprises an extension disposed at its proximal end, and wherein the pulling apparatus receiving feature is disposed in the extension.

8. The joining system of claim 7, wherein the extension forms an acute angle with a body of the bracket, and wherein the frame receiving feature is disposed on the body.

9. The joining system of claim 1, wherein the frame receiving feature comprises a pair of extensions that extend upward from both sides of a body of the bracket.

10. A linear lighting system comprising:

a first linear light fixture comprising a first frame having a top wall, a first side wall, and a second side wall, wherein the top wall has an aperture that traverses therethrough toward its distal end;

a second linear light fixture comprising a second frame; and a joining system configured to join the second linear light fixture to the first linear light fixture, the joining system comprising:

a pulling apparatus comprising a proximal portion, a first distal portion, and a second distal portion;

a bracket coupled to the frame of the first linear light fixture, wherein the bracket comprises a frame receiving feature and a pulling apparatus receiving feature, wherein the frame receiving feature is configured to be slidably coupled to the frame of the second linear light fixture, and wherein the pulling apparatus receiving feature is configured to slidably couple to the proximal portion of the pulling apparatus;

a first anchor coupled to the first side wall of the frame of the second linear light fixture, wherein the first anchor comprises a first pulling apparatus coupling feature that is configured to couple to the first distal portion of the pulling apparatus;

a second anchor coupled to the second side wall of the frame of the second linear light fixture, wherein the second anchor comprises a second pulling apparatus coupling feature that is configured to couple to the second distal portion of the pulling apparatus; and a gripper coupled to the pulling apparatus receiving feature of the bracket, wherein the gripper comprises a channel that passes therethrough, wherein the channel is configured to have the proximal portion of the pulling apparatus slidably disposed therein, and wherein the gripper reduces slack in the pulling apparatus between the gripper and the first anchor and the second anchor, wherein a distal end of the distal portion of the pulling apparatus is configured to traverse through the aperture in the top wall of the frame of the first linear light fixture, and wherein the second linear light fixture is pulled along the bracket toward the first linear light fixture when a sufficiently large upward force pulls the distal end of the distal portion of the pulling apparatus.

11. The linear lighting system of claim 10, wherein the first side wall of the frame of the second linear light fixture has a first slot disposed on its inner surface, wherein the second side wall of the frame of the second linear light fixture has a second slot disposed on its inner surface, wherein the first anchor is disposed in the first slot, and wherein the second anchor is disposed in the second slot.

12. The linear lighting system of claim 11, wherein the first side wall of the frame of the first linear light fixture has the first slot disposed on its inner surface, wherein the second side wall of the frame of the first linear light fixture has the second slot disposed on its inner surface, wherein the first anchor engages the first slot of the first linear light fixture as the second linear light fixture is pulled along the bracket toward the first linear light fixture, and wherein the second anchor engages the second slot of the first linear light fixture as the second linear light fixture is pulled along the bracket toward the first linear light fixture.

13. The linear lighting system of claim 12, wherein the first linear light fixture further comprises a tray disposed within the first slot in the first side wall of the frame of the first linear light fixture and within the second slot in the second side wall of the frame of the first linear light fixture, and wherein the bracket of the joining system is positioned within a cavity formed between the tray and the frame.

14. The linear lighting system of claim 10, wherein the top wall of the frame of the second linear light fixture has a protrusion that extends from its inner surface, and wherein the frame receiving feature of the bracket slidably engages the protrusion.

15. The linear lighting system of claim 10, further comprising:

a third linear light fixture comprising the frame;

an additional joining system configured to join the third linear light fixture to the second linear light fixture, the additional joining system comprising:

an additional pulling apparatus comprising the proximal portion, the first distal portion, and the second distal portion;

an additional bracket coupled to the frame of the second linear light fixture, wherein the additional bracket comprises the frame receiving feature and the pulling apparatus receiving feature, wherein the frame receiving feature of the additional bracket is configured to be slidably coupled to the frame of the second linear light fixture, and wherein the pulling apparatus receiving feature of the additional bracket is configured to slidably couple to the proximal portion of the additional pulling apparatus;

a third anchor coupled to the first side wall of the frame of the third linear light fixture, wherein the third anchor comprises a third pulling apparatus coupling feature that is configured to couple to the first distal portion of the additional pulling apparatus; and a fourth anchor coupled to the second side wall of the frame of the third linear light fixture, wherein the fourth anchor comprises a fourth pulling apparatus coupling feature that is configured to couple to the second distal portion of the additional pulling apparatus, wherein a distal end of the distal portion of the additional pulling apparatus is configured to traverse through the aperture in the top wall of the frame of the second linear light fixture, and wherein the third linear light fixture is pulled along the additional bracket toward the second linear light fixture when the sufficiently large upward force is applied to the distal end of the distal portion of the additional pulling apparatus.

* * * * *